United States Patent
Maeda et al.

(10) Patent No.: US 9,108,873 B2
(45) Date of Patent: Aug. 18, 2015

(54) GLASS-SUBSTRATE MANUFACTURING METHOD AND GLASS-SUBSTRATE MANUFACTURING DEVICE

(71) Applicants: Nobuhiro Maeda, Tokyo (JP); Hiroyuki Kariya, Yokkaichi (JP)

(72) Inventors: Nobuhiro Maeda, Tokyo (JP); Hiroyuki Kariya, Yokkaichi (JP)

(73) Assignee: AvanStrate Inc., Mie (JP)

( * ) Notice: Subject to any disclaimer, the term of this patent is extended or adjusted under 35 U.S.C. 154(b) by 181 days.

(21) Appl. No.: 13/719,820

(22) Filed: Dec. 19, 2012

(65) Prior Publication Data

US 2013/0118206 A1 May 16, 2013

Related U.S. Application Data

(63) Continuation of application No. PCT/JP2012/058715, filed on Mar. 30, 2012.

(30) Foreign Application Priority Data

| Mar. 31, 2011 | (JP) | 2011-081265 |
| Mar. 31, 2011 | (JP) | 2011-081266 |
| Mar. 31, 2011 | (JP) | 2011-081267 |
| Mar. 31, 2011 | (JP) | 2011-081268 |

(51) Int. Cl.
C03B 17/06 (2006.01)

(52) U.S. Cl.
CPC .............. *C03B 17/067* (2013.01); *C03B 17/064* (2013.01)

(58) Field of Classification Search
CPC .... C03B 17/064; C03B 17/067; C03B 17/068
See application file for complete search history.

(56) References Cited

U.S. PATENT DOCUMENTS

| 3,682,609 | A  | * | 8/1972 | Dockerty | 65/83 |
| 6,758,064 | B1 | * | 7/2004 | Kariya | 65/91 |
| 2005/0076677 | A1 | * | 4/2005 | Pitbladdo | 65/53 |
| 2009/0100873 | A1 | * | 4/2009 | Allan et al. | 65/85 |

(Continued)

FOREIGN PATENT DOCUMENTS

| CN | 101228094 A | 7/2008 |
| CN | 101312918 A | 11/2008 |

(Continued)

OTHER PUBLICATIONS

JP05-124827 English Translation Performed by FLS, Inc., Oct. 2013.*

(Continued)

*Primary Examiner* — Lisa Herring
(74) *Attorney, Agent, or Firm* — Sughrue Mion, PLLC

(57) ABSTRACT

A glass-substrate manufacturing method according to an aspect of the invention is a method for manufacturing glass substrates by employing a down-draw process. In down-draw processing, a molten glass is made to overflow from a forming member and formed into a sheet glass and the sheet glass is then cooled while being drawn in a downward-flow direction. In this glass-substrate manufacturing method, after the sheet glass has separated from the forming member and when the temperature of the sheet glass is within a temperature region ranging from a temperature higher than the softening point to a temperature near the annealing point, the sheet glass is cooled by maintaining the viscosity of side sections of the sheet glass within a range of $10^{9.0}$-$10^{14.5}$ poise while applying a tension toward the side sections.

12 Claims, 10 Drawing Sheets

(56) References Cited

U.S. PATENT DOCUMENTS

| | | | |
|---|---|---|---|
| 2009/0226733 A1* | 9/2009 | Kato et al. | 428/428 |
| 2010/0218557 A1 | 9/2010 | Aniolek et al. | |
| 2010/0300214 A1* | 12/2010 | Cady et al. | 73/862.49 |

FOREIGN PATENT DOCUMENTS

| | | | |
|---|---|---|---|
| CN | 101817633 A | | 9/2010 |
| JP | 02-225326 A | | 9/1990 |
| JP | 05-124827 A | | 5/1993 |
| JP | 05124827 A | * | 5/1993 |
| JP | 2001-031435 A | | 2/2001 |
| JP | 3335291 B2 | | 10/2002 |
| JP | 2007-051028 A | | 3/2007 |
| WO | 2007014066 A2 | | 2/2007 |
| WO | 2007037871 A1 | | 4/2007 |

OTHER PUBLICATIONS

International Search Report of PCT/JP2012/058715 dated Jun. 26, 2012.

English Translation of the International Preliminary Report on Patentability and Written Opinion of the International Searching Authority mailed Oct. 17, 2013 for corresponding International Application No. PCT/JP2012/058715.

* cited by examiner

GLASS-SUBSTRATE MANUFACTURING METHOD AND GLASS-SUBSTRATE MANUFACTURING DEVICE

CROSS REFERENCE TO RELATED APPLICATIONS

This application is a continuation of International Application No. PCT/JP2012/058715 filed Mar. 30, 2012, which claims priority from Japanese Patent Application No. 2011-081265 filed Mar. 31, 2011, Japanese Patent Application No. 2011-081266 filed Mar. 31, 2011, Japanese Patent Application No. 2011-081267 filed Mar. 31, 2011 and Japanese Patent Application No. 2011-081268 filed Mar. 31, 2011.

TECHNICAL FIELD

The present invention relates to a glass-substrate manufacturing method.

BACKGROUND ART

Methods for manufacturing glass substrates by employing down-draw processing have conventionally been used. In down-draw processing, molten glass is first poured into a forming member, and then, the molten glass is made to overflow from the forming member. The molten glass then flows downward along the forming member. The streams of the molten glass merge at the lower end of the forming member, and the molten glass then separates from the forming member and is made into a sheet-form glass (sheet glass). The sheet glass is cooled by the atmosphere inside a furnace while flowing downward. The sheet glass is then cut into desired sizes, and is further processed and finally made into glass substrates.

SUMMARY OF THE INVENTION

Technical Problem

In the aforementioned glass-substrate manufacturing method, however, the sheet glass contracts in the width direction due to surface tension at the same time the molten glass separates from the forming member. As a result, the edges in the width direction of the sheet glass bulge outward (creating rounded edges), and thus, these rounded edges need to be cut off. If the contraction of the sheet glass is significant, then large areas of the edges of the sheet glass need to be cut off, thus reducing the width of the sheet glass that can be put to practical use. Thus, the aforementioned method has a drawback in that the efficiency of manufacturing glass substrates is poor.

As a means for overcoming the aforementioned drawback, Patent Literature 1 (Japanese Patent Application Laid-Open Publication JP-A-5-124827) discloses a construction in which the edges of a sheet glass are cooled between the forming member and drawing rollers located below the forming member by using cooling units that are provided in the vicinity of the widthwise (lateral) edges of the sheet glass and spaced away from the sheet glass. This inhibits the widthwise contraction of the sheet glass that has separated from the forming member.

In some cases, however, the technique disclosed in Patent Literature 1 (JP-A-5-124827) cannot sufficiently inhibit the widthwise contraction of the sheet glass. This is because the use of only those cooling units, which are provided spaced away from the sheet glass in the vicinity of the lower end of the forming member and the vicinity of the widthwise (lateral) edges of the sheet glass, may be insufficient to provide the ability to cool the sheet glass and also insufficient to inhibit the widthwise contraction of the sheet glass.

Thus, an objective of the present invention is to provide a glass-substrate manufacturing method with which it is possible to effectively inhibit the widthwise contraction of a sheet glass that has separated from a forming member.

Solution to Problem

A glass-substrate manufacturing method according to an aspect of the present invention is a method for manufacturing glass substrates by employing a down-draw process. In down-draw processing, a molten glass is made to overflow from a forming member and formed into a sheet glass and the sheet glass is then cooled while being drawn in a downward-flow direction. In this glass-substrate manufacturing method, after the sheet glass has separated from the forming member and when the temperature of the sheet glass is within a temperature region ranging from a temperature higher than the softening point to a temperature near the annealing point, the sheet glass is cooled by maintaining the viscosity of side sections of the sheet glass within a range of $10^{9.0}$-$10^{14.5}$ poise while applying a tension toward the side sections.

When the temperature of the sheet glass that has separated from the forming member is within a temperature region ranging from a temperature higher than the softening point to a temperature near the annealing point, the sheet glass has low viscosity and sufficient flowability, and is thus prone to contraction. It should be noted that the expression "the temperature of the sheet glass is within a temperature region ranging from a temperature higher than the softening point to a temperature near the annealing point" means that at least a portion of the sheet glass is within this temperature region. Preferably, the viscosity of the sheet glass immediately below the forming member is $10^{5.7}$-$10^{7.5}$ poise.

In this glass-substrate manufacturing method, more specifically, by cooling the sheet glass while maintaining the viscosity of the side sections of the sheet glass, which has separated from the forming member, within the range of $10^{9.0}$-$10^{14.5}$ poise, the widthwise contraction of the sheet glass is inhibited. If the viscosity of the side sections of the sheet glass is below $10^{9.0}$ poise, then the sheet glass is prone to deformation, and thus, the widthwise contraction of the sheet glass is likely to occur. On the other hand, if the viscosity of the side sections of the sheet glass is above $10^{14.5}$ poise, then the sheet glass may break because it cannot resist the stress that occurs inside the sheet glass. Thus, it is preferable to cool the sheet glass by maintaining the viscosity of the side sections of the sheet glass within the range of $10^{9.0}$-$10^{14.5}$ poise. Further, it is more preferable to cool the sheet glass by maintaining the viscosity of the side sections of the sheet glass within a range of $10^{10.0}$-$10^{14.5}$ poise.

By cooling the sheet glass while maintaining the viscosity of the side sections of the sheet glass, which has separated from the forming member, within the range of $10^{9.0}$-$10^{14.5}$ poise, the widthwise contraction of the sheet glass is inhibited, and thus, a state is achieved in which a tension is applied in the width direction of the sheet glass toward both end sections of the sheet glass. It should be noted that it is preferable to retain the sheet glass with cooling rollers in which air is passed through the interior thereof. In this way, the widthwise contraction of the sheet glass is inhibited more effectively.

It is preferable to cool the sheet glass in a manner such that the viscosity of the side sections of the sheet glass increases along the downward-flow direction. In this way, the side sections of the sheet glass are cooled continuously or in stages, and thus, the sheet glass is prevented from being excessively cooled at once and breaking.

It is also preferable to perform a thickness-equalizing process and a warpage-reducing process when the temperature of the sheet glass is within the aforementioned temperature region ranging from a temperature higher than the softening point to a temperature near the annealing point. The thickness-equalizing process is a step of equalizing the thickness of the sheet glass along the width direction. The warpage-reducing process is a step of reducing warpage of the sheet glass after the thickness-equalizing process.

It is preferable that, in the thickness-equalizing step, the widthwise temperature distribution in a central region of the sheet glass is kept uniform, and the temperature in both the side sections of the sheet glass is made lower than the temperature in the central region. In this way, the side sections of the sheet glass are cooled in a manner such that the widthwise contraction is inhibited, whereas the central region of the sheet glass is cooled in a manner such that the thickness becomes uniform. Thus, the thickness of the sheet glass can be made uniform along the width direction. Note here that the central region of the sheet glass is a region including sections subjected to thickness equalization, and the end sections of the sheet glass are regions including sections subjected to cutting after manufacture.

It should be noted that it is preferable to perform the thickness-equalizing process during a period from immediately after the sheet glass has separated from the forming member and until the temperature of the sheet glass is cooled to the softening point. In this way, the plate thickness can be made more uniform.

It is preferable that, in the warpage-reducing step, the widthwise temperature distribution of the sheet glass is set to temperatures lower than the temperature distribution in the thickness-equalizing step, and a temperature gradient is formed in the width direction of the sheet glass from a widthwise central section of the central region of the sheet glass toward the side sections. Further, by cooling the sheet glass in a manner such that the temperature gradient of the sheet glass is reduced as the temperature of the sheet glass decreases toward the strain point, it is possible to cool the sheet glass in a manner such that a tensile stress always acts on the widthwise central section of the sheet glass. In this way, the sheet glass can be cooled while maintaining the thickness thereof uniform, and warpage of the sheet glass can also be reduced. It should be noted that the term "temperature gradient" in the expression "the temperature gradient of the sheet glass is reduced" refers to the absolute value of a quotient value found by dividing, by half the width of the sheet glass, a value found by subtracting the temperature of the widthwise (lateral) edge section of the sheet glass from the temperature of the widthwise central section of the sheet glass.

Preferably, the viscosity of the sheet glass immediately below the forming member is $10^{5.7}$-$10^{7.5}$ poise, and the sheet glass is cooled rapidly in a manner such that the viscosity of the side sections of the sheet glass becomes greater than or equal to $10^{9.0}$ poise.

The sheet glass is most susceptible to contraction immediately after separating from the forming member. So, by performing rapid cooling, the widthwise contraction can be inhibited effectively. Moreover, in cases where the thickness-equalizing process is performed immediately below the forming member, by rapidly cooling the sheet glass in a manner such that the viscosity of the side sections of the sheet glass becomes greater than or equal to $10^{9.0}$ poise, the plate thickness can be equalized in a state where the widthwise contraction of the sheet glass is inhibited. Thus, the sections in the sheet glass in which the thickness is equalized can be enlarged.

Moreover, it is preferable that, after rapidly cooling the sheet glass, the viscosity of the side sections is maintained within the range of $10^{9.0}$-$10^{14.5}$ poise by cooling the side sections with a cooling capacity that is lower than that during the rapid cooling. In this way, the side sections of the sheet glass are cooled continuously or in stages, and thus, the sheet glass can be prevented from being excessively cooled at once and breaking.

Furthermore, it is preferable that, in the thickness-equalizing step, the widthwise temperature distribution in a central region of the sheet glass is kept uniform, and the temperature in both the side sections of the sheet glass is made lower than the temperature in the central region. Moreover, it is preferable that, in the warpage-reducing step, the widthwise temperature distribution of the sheet glass is set to temperatures lower than the temperature distribution in the thickness-equalizing step, and a temperature gradient is formed in the width direction of the sheet glass from the center section of the central region toward the side sections.

A glass-substrate manufacturing device according to the present invention includes a forming member, a first heat-treatment unit, and a second heat-treatment unit. The forming member has a pair of top sections, a lower end, and a pair of surfaces. The pair of surfaces extend from the respective top sections to the lower end. The forming member forms a sheet glass by making a molten glass overflow from the pair of top sections, then making the molten glass flow downward along the pair of surfaces, and making the molten glass merge at the lower end. The first heat-treatment unit performs a heat treatment on side sections of the sheet glass when the sheet glass that has separated from the forming member is in a temperature region higher than the softening point. The second heat-treatment unit performs a heat treatment on the aforementioned side sections when the sheet glass is in a temperature region ranging from a temperature near the softening point to a temperature near the annealing point. The first heat-treatment unit and the second heat-treatment unit cool the sheet glass by maintaining the viscosity of the aforementioned side sections within a range of $10^{9.0}$-$10^{14.5}$ poise while applying a tension toward said side sections. Thus, it is possible to increase the amount of production of glass substrates and to improve warpage quality.

A glass-substrate manufacturing method according to another aspect of the present invention is a method for manufacturing glass substrates by employing a down-draw process. In down-draw processing, a molten glass is made to overflow from a forming member and formed into a sheet glass and the sheet glass is then cooled while being drawn in a downward-flow direction. In this glass-substrate manufacturing method, after the sheet glass has separated from the forming member and when the temperature of the sheet glass is within a temperature region ranging from a temperature higher than the softening point to a temperature near the annealing point, the sheet glass is cooled by maintaining the viscosity of side sections in the width direction of the sheet glass within a range of $10^{9.0}$-$10^{14.5}$ poise while applying a tension in the width direction of the sheet glass toward both the side sections.

When the temperature of the sheet glass that has separated from the forming member is within a temperature region ranging from a temperature higher than the softening point to a temperature near the annealing point, the sheet glass has low viscosity and sufficient flowability, and is thus prone to contraction. It should be noted that the expression "the temperature of the sheet glass is within a temperature region ranging from a temperature higher than the softening point to a temperature near the annealing point" means that at least a portion of the sheet glass is within this temperature region. Preferably, the viscosity of the sheet glass immediately below the forming member is $10^{5.7}$-$10^{7.5}$ poise.

In this glass-substrate manufacturing method, more specifically, by cooling the sheet glass while maintaining the viscosity of the side sections of the sheet glass, which has separated from the forming member, within the range of $10^{9.0}$-$10^{14.5}$ poise, the widthwise contraction of the sheet glass is inhibited. If the viscosity of the side sections of the sheet glass is below $10^{9.0}$ poise, then the sheet glass is prone to deformation, and thus, the widthwise contraction of the sheet glass is likely to occur. On the other hand, if the viscosity of the side sections of the sheet glass is above $10^{14.5}$ poise, then the sheet glass may break because it cannot resist the stress that occurs inside the sheet glass. Thus, it is preferable to cool the sheet glass by maintaining the viscosity of the side sections of the sheet glass within the range of $10^{9.0}$-$10^{14.5}$ poise. Further, it is more preferable to cool the sheet glass by maintaining the viscosity of the side sections of the sheet glass within a range of $10^{10.0}$-$10^{14.5}$ poise.

By cooling the sheet glass while maintaining the viscosity of the side sections of the sheet glass, which has separated from the forming member, within the range of $10^{9.0}$-$10^{14.5}$ poise, the widthwise contraction of the sheet glass is inhibited, and thus, a state is achieved in which a tension is applied in the width direction of the sheet glass toward both end sections of the sheet glass. It should be noted that it is preferable to retain the sheet glass with cooling rollers in which air is passed through the interior thereof. In this way, the widthwise contraction of the sheet glass is inhibited more effectively.

It is preferable to cool the sheet glass in a manner such that the viscosity of the side sections of the sheet glass increases along the downward-flow direction. In this way, the side sections of the sheet glass are cooled continuously or in stages, and thus, the sheet glass is prevented from being excessively cooled at once and breaking.

Preferably, the viscosity of the sheet glass immediately below the forming member is $10^{5.7}$-$10^{7.5}$ poise; the sheet glass is cooled rapidly in a manner such that the viscosity of the side sections of the sheet glass falls within a range of $10^{9.0}$-$10^{10.5}$ poise; and after rapidly cooling the sheet glass, the viscosity of the aforementioned side sections is maintained within a range of $10^{10.5}$-$10^{14.5}$ poise by cooling the side sections with a cooling capacity that is lower than that during the rapid cooling.

By rapidly cooling the sheet glass, which has a viscosity of $10^{5.7}$-$10^{7.5}$ poise immediately below the forming member, in a manner such that the viscosity of the side sections falls within a range of $10^{9.0}$-$10^{10.5}$ poise, it is possible to inhibit the widthwise contraction of the sheet glass while preventing the sheet glass from breaking. Also, by further cooling the sheet glass after the rapid cooling thereof in a manner such that the viscosity of the side sections falls within a range of $10^{10.5}$-$10^{14.5}$ poise, it is possible to continue inhibiting the widthwise contraction of the sheet glass while preventing the sheet glass from breaking.

It should be noted that it is more preferable to rapidly cool the sheet glass, which has a viscosity of $10^{5.7}$-$10^{7.5}$ poise immediately below the forming member, in a manner such that the viscosity of the side sections falls within a range of $10^{9.5}$-$10^{10.5}$ poise, and even more preferable to rapidly cool the aforementioned sheet glass in a manner such that the viscosity of the side sections falls within a range of $10^{10.0}$-$10^{10.5}$ poise. Moreover, after rapidly cooling the sheet glass, it is more preferable to cool the sheet glass such that the viscosity of the side sections falls within a range of $10^{11.0}$-$10^{14.5}$ poise, and even more preferable to cool the sheet glass such that the viscosity of the side sections falls within a range of $10^{11.5}$-$10^{14.5}$ poise.

Further, it is preferable to use cooling rollers to rapidly cool the sheet glass immediately below the forming member in a manner such that the viscosity of the side sections falls within the range of $10^{9.0}$-$10^{10.5}$ poise. By bringing the cooling rollers into contact with the sheet glass, heat can be removed from the sheet glass in a short time through heat conduction, and thus, the sheet glass can be cooled rapidly. Furthermore, by retaining the sheet glass with the cooling rollers, the widthwise contraction can further be inhibited.

Moreover, it is preferable to maintain the viscosity of the side sections of the sheet glass within the range of $10^{10.5}$-$10^{14.5}$ poise by cooling, with a cooling unit provided spaced away from the sheet glass, the aforementioned sheet glass that has been cooled rapidly by the cooling rollers. In this way, the sheet glass is continuously cooled through radiant heat transfer by the cooling unit provided spaced away from the sheet glass, and thus, the surface of the sheet glass can be prevented from being cooled excessively and breaking. It should be noted that it is preferable to provide a plurality of cooling units. In this way, the surface of the sheet glass can be effectively inhibited from being excessively cooled, and the sheet glass can be effectively inhibited from breaking.

It is also preferable to perform a thickness-equalizing process and a warpage-reducing process when the temperature of the sheet glass is within the aforementioned temperature region ranging from a temperature higher than the softening point to a temperature near the annealing point. The thickness-equalizing process is a step of equalizing the thickness of the sheet glass along the width direction. The warpage-reducing process is a step of reducing warpage of the sheet glass after the thickness-equalizing process.

It is preferable that, in the thickness-equalizing step, the widthwise temperature distribution in a central region of the sheet glass is kept uniform, and the temperature in both the side sections of the sheet glass is made lower than the temperature in the central region. In this way, the side sections of the sheet glass are cooled in a manner such that the widthwise contraction is inhibited, whereas the central region of the sheet glass is cooled in a manner such that the thickness becomes uniform. Thus, the thickness of the sheet glass can be made uniform along the width direction. Note here that the central region of the sheet glass is a region including sections subjected to thickness equalization, and the end sections of the sheet glass are regions including sections subjected to cutting after manufacture.

It should be noted that it is preferable to perform the thickness-equalizing process during a period from immediately after the sheet glass has separated from the forming member and until the temperature of the sheet glass is cooled to the softening point. In this way, the plate thickness can be made more uniform.

It is preferable that, in the warpage-reducing step, the widthwise temperature distribution of the sheet glass is set to temperatures lower than the temperature distribution in the thickness-equalizing step, and a temperature gradient is formed in the width direction of the sheet glass from a widthwise central section of the central region of the sheet glass toward the side sections. Further, by cooling the sheet glass in a manner such that the temperature gradient of the sheet glass is reduced as the temperature of the sheet glass decreases toward the strain point, it is possible to cool the sheet glass in a manner such that a tensile stress always acts on the widthwise central section of the sheet glass. In this way, the sheet glass can be cooled while maintaining the thickness thereof uniform, and warpage of the sheet glass can also be reduced. It should be noted that the term "temperature gradient" in the expression "the temperature gradient of the sheet glass is reduced" refers to the absolute value of a quotient found by dividing, by half the width of the sheet glass, a value found by subtracting the temperature of the widthwise end section of the sheet glass from the temperature of the widthwise central section of the sheet glass.

Furthermore, it is preferable that, in the thickness-equalizing step, the widthwise temperature distribution in a central region of the sheet glass is kept uniform, and the temperature in both the side sections of the sheet glass is made lower than the temperature in the central region. Moreover, it is preferable that, in the warpage-reducing step, the widthwise temperature distribution of the sheet glass is set to temperatures lower than the temperature distribution in the thickness-equalizing step, and a temperature gradient is formed in the width direction of the sheet glass from the center section of the central region toward the side sections.

Moreover, it is preferable that, in the warpage-reducing step, the sheet glass is cooled toward a temperature near the strain point of the sheet glass in a manner such that the temperature gradient formed in the width direction of the sheet glass is reduced. By cooling the sheet glass to the strain point in a manner such that the temperature gradient formed in the warpage-reducing step is reduced, the cooling amount in the widthwise central section of the sheet glass becomes larger than the cooling amount in the widthwise (lateral) end sections of the sheet glass. In this way, the amount of volumetric shrinkage of the sheet glass increases from the widthwise end sections of the sheet glass toward the central section, and thus, a tensile stress acts on the central section of the sheet glass. Particularly, a tensile stress acts on the central section of the sheet glass in both the flow direction and the width direction of the sheet glass. It should be noted that, preferably, the tensile stress acting in the flow direction of the sheet glass is larger than the tensile stress acting in the width direction of the sheet glass. With this tensile stress, the sheet glass can be cooled while maintaining the flatness of the sheet glass, and thus, the warpage of the sheet glass can be reduced.

Advantageous Effects of Invention

With the glass-substrate manufacturing method of the present invention, it is possible to increase the amount of production of glass substrates and to improve warpage quality.

DESCRIPTION OF EMBODIMENTS (1) Overall Configuration

The glass-substrate manufacturing method according to the present embodiment manufactures glass substrates for flat panel displays, such as those of liquid crystal TVs, plasma TVs, and laptop computers. The glass substrates are manufactured by employing a down-draw process.

Figure 1:
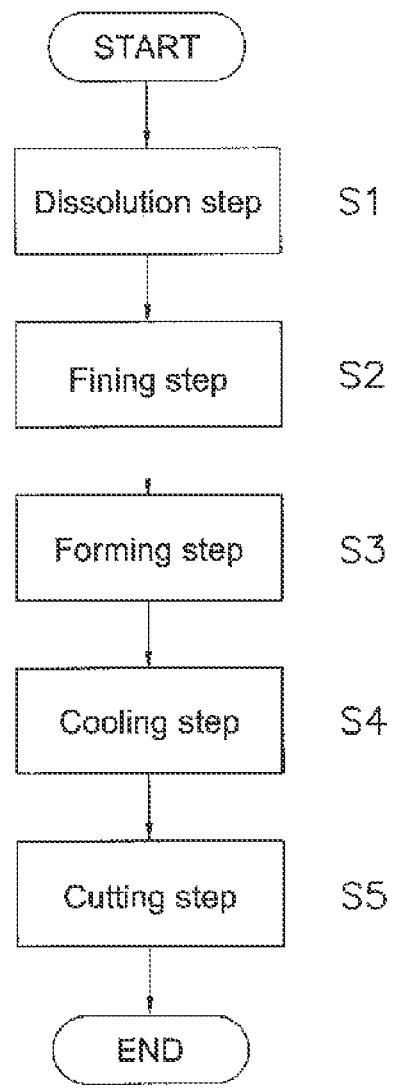
FIG. 1 is a flowchart illustrating a method for manufacturing a glass substrate.
Figure 2:
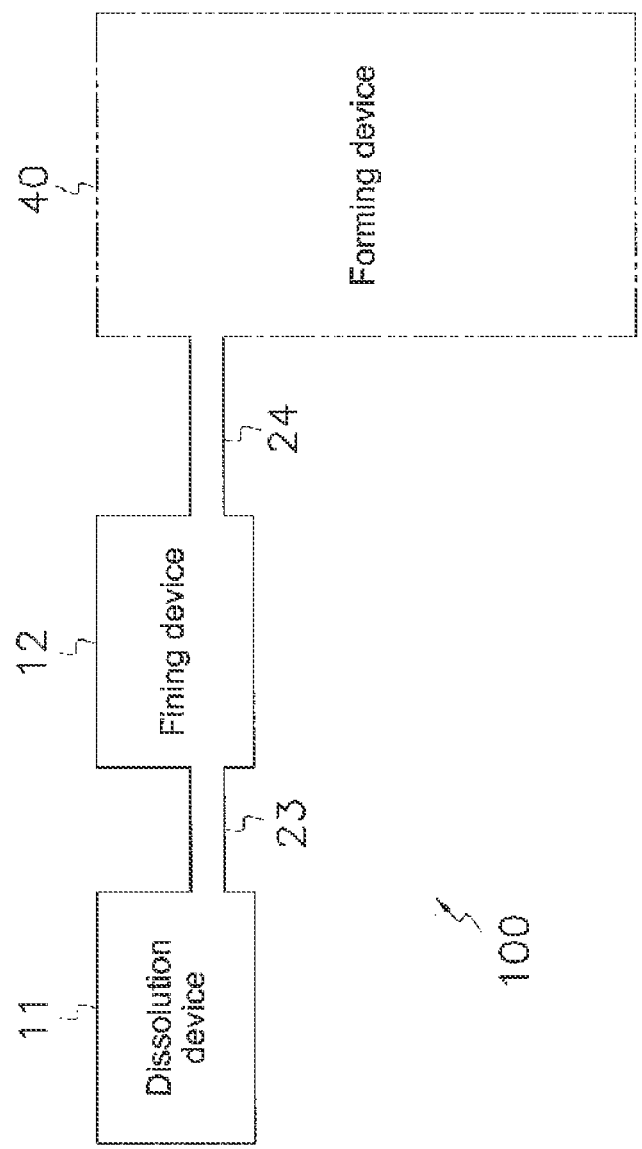
FIG. 2 is a schematic configuration diagram of a glass-substrate manufacturing device.

The plurality of steps for manufacturing a glass substrate (i.e., a glass-substrate manufacturing method) and a glass-substrate manufacturing device 100 used for those steps are described with reference to FIGS. 1 and 2.

The plurality of steps include a dissolution step S1, a fining step S2, a forming step S3, a cooling step S4, and a cutting step S5.

The dissolution step S1 is a step where a glass raw material is dissolved. As illustrated in FIG. 2, the glass raw material is introduced into a dissolution device 11 which is disposed in an upstream position. The glass raw material is dissolved in the dissolution device 11 and made into a molten glass FG. The molten glass FG is sent to a fining device 12 through an upstream pipe 23.

The fining step S2 is a step where bubbles in the molten glass FG are removed. After the bubbles are removed in the fining device 12, the molten glass FG is then sent to a forming device 40 through a downstream pipe 24.

The forming step S3 is a step in which the molten glass FG is formed into a sheet-form glass (sheet glass) SG. Specifically, the molten glass FG is sent into a forming member 41 included in the forming device 40, and is then made to overflow from the forming member 41. The molten glass FG that has overflowed then flows downward along the surfaces of the forming member 41. The streams of the molten glass FG then merge at the lower end of the forming member 41, and the molten glass is made into a sheet glass SG.

The cooling step S4 is a step in which the sheet glass SG is cooled (annealed). Through this cooling step S4, the glass sheet is cooled to a temperature close to room temperature. It should be noted that the thickness (plate thickness) of the glass substrate, the amount of warpage of the glass substrate, and the amount of strain of the glass substrate are determined depending on the cooling state in this cooling step S4.

The cutting step S5 is a step in which the sheet glass SG, which has reached a temperature close to room temperature, is cut into predetermined sizes.

It should be noted that the pieces of sheet glass SG (glass pieces) that have been cut into predetermined sizes undergo such steps as end-surface processing and are made into glass substrates.

The configuration of the forming device 40 will be described below with reference to FIGS. 3 to 9. It should be noted that, in the present embodiment, the width direction of the sheet glass SG refers to a direction intersecting with the direction of the downward flow of the sheet glass SG (i.e., downward-flow direction or flow direction)—i.e., refers to the horizontal direction.

(2) Configuration of Forming Device

Figure 3:
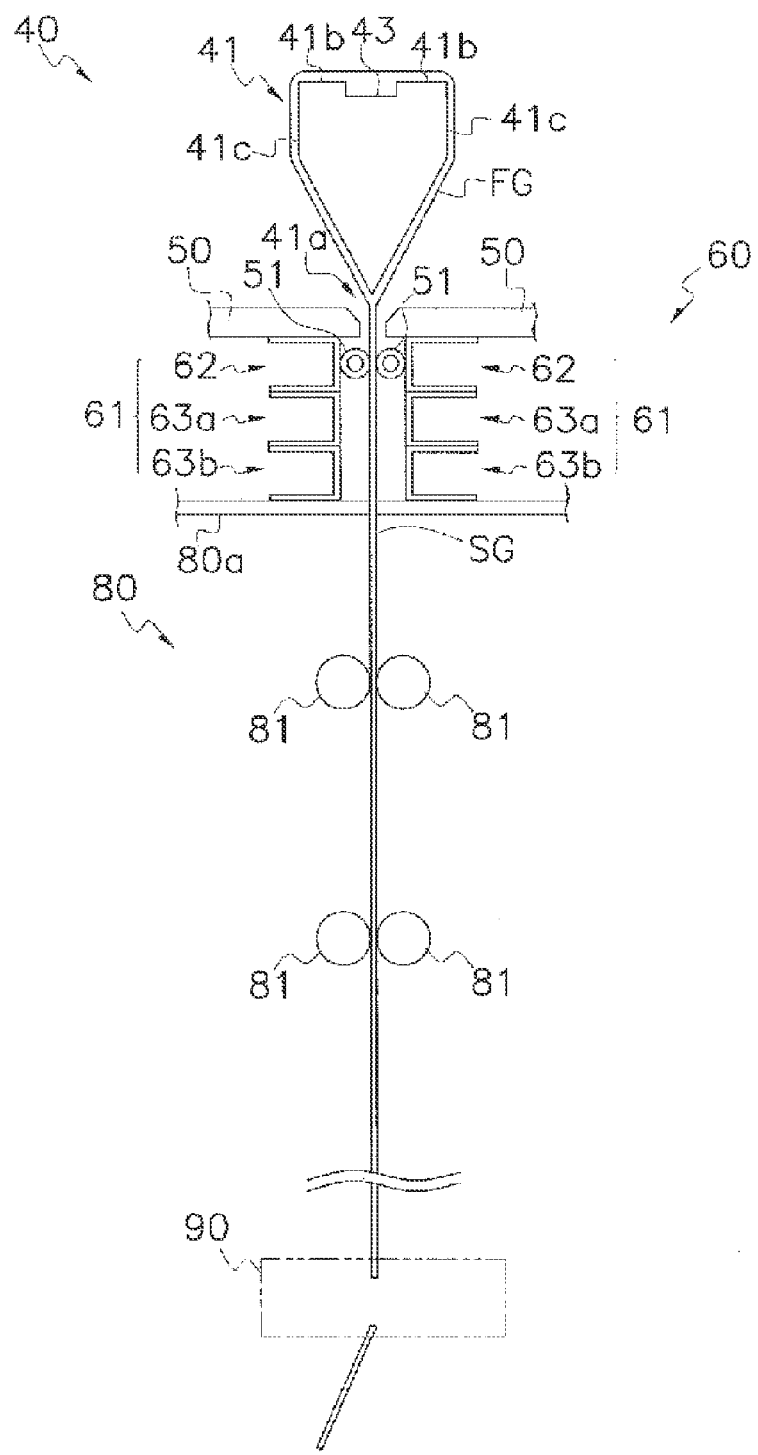
FIG. 3 is a schematic configuration diagram (cross-sectional view) of a forming device.
Figure 4:
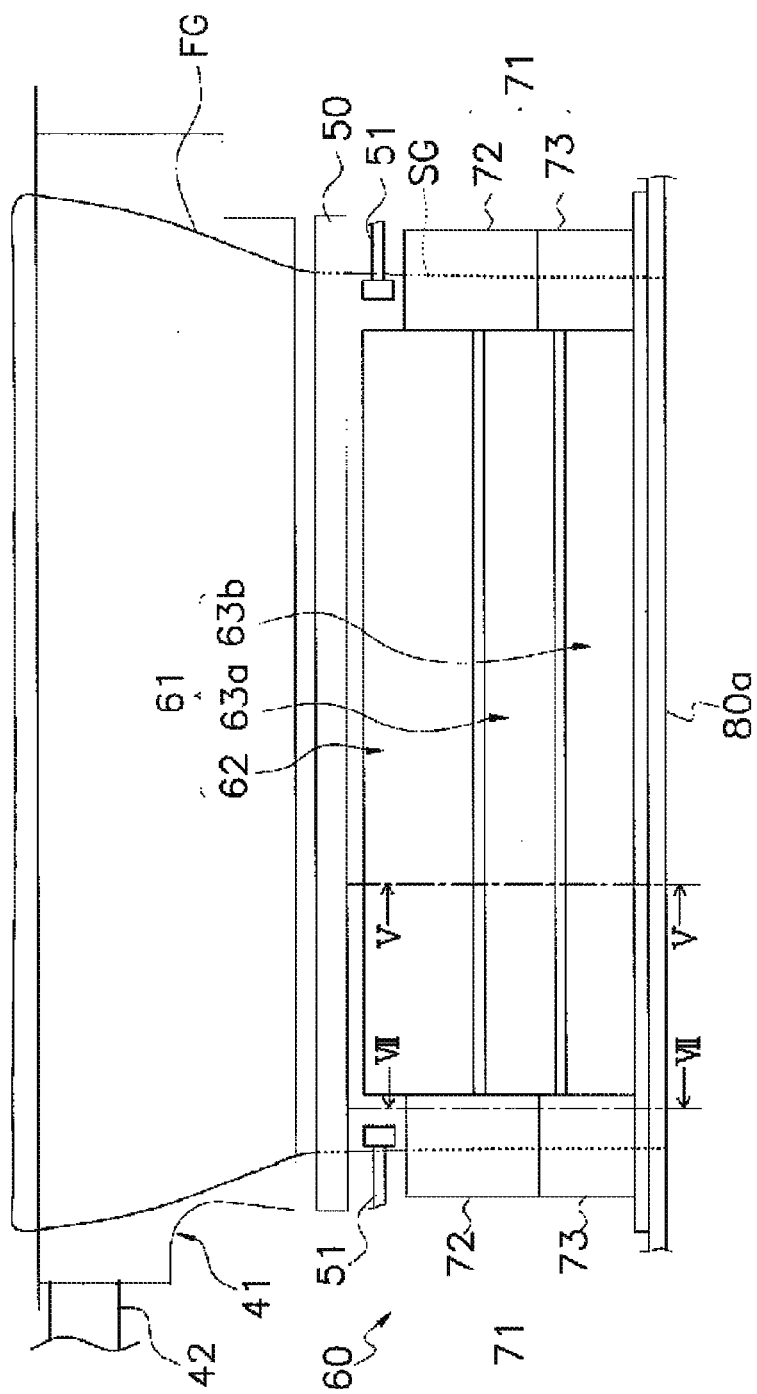
FIG. 4 is a schematic configuration diagram (side view) of the forming device.

First, FIGS. 3 and 4 illustrate a schematic configuration of the forming device 40. FIG. 3 is a cross-sectional view of the forming device 40. FIG. 4 is a side view of the forming device 40. The forming device 40 is mainly made up of: a forming member 41; partitioning components 50; cooling rollers 51; a cooling unit 60; down-draw rollers 81; and a cutting device 90. The forming device 40 also includes a control device 91 (see FIG. 9). The control device 91 controls the respective drive sections of the components included in the forming device 40. The various components included in the forming device 40 will be described below.

(2-1) Forming Member

The forming member 41 forms the molten glass FG into a sheet-form glass (sheet glass SG) by making the molten glass FG overflow therefrom.

As illustrated in FIG. 3, the forming member 41 has a substantially pentagonal cross-sectional shape (a shape like a wedge). The tip end of the substantially pentagonal shape corresponds to the lower end 41a of the forming member 41.

The forming member 41 also has an inlet 42 in the first end thereof (see FIG. 4). The inlet 42 is connected to the aforementioned downstream pipe 24, and the molten glass FG that has flowed out from the fining device 12 is introduced into the forming member 41 through this inlet 42. The forming member 41 has a groove 43 formed therein. The groove 43 extends in the length direction of the forming member 41. Specifically, the groove 43 extends from the first end to a second end which is the end on the opposite side from the first end. More specifically, the groove 43 extends in the left-to-right direction in FIG. 4. The groove 43 is deepest near the inlet 42, and is formed such that it becomes gradually shallower as it approaches the second end. The molten glass FG introduced into the forming member 41 overflows from a pair of top sections 41b, 41b of the forming member 41, and flows downward along a pair of side surfaces (surfaces) 41c, 41c of the forming member 41. The streams of molten glass FG then merge at the lower end 41a of the forming member 41, and the molten glass is made into a sheet glass SG. It should be noted that the viscosity of the sheet glass SG is $10^{5.7}$-$10^{7.5}$ poise immediately below the forming member 41.

(2-2) Partitioning Components

The partitioning components 50 are disposed near the merging point of the molten glass FG. As illustrated in FIG. 3, the partitioning components 50 are disposed on opposite sides in the thickness direction of the molten glass FG (sheet glass SG) that has merged at the merging point. The partitioning components 50 are made of a heat insulator. The partitioning components 50 partition the upper atmosphere and the lower atmosphere with respect to the merging point of the molten glass FG, and thereby block the movement of heat from above to below the partitioning components 50.

(2-3) Cooling Rollers

The cooling rollers 51 are a unit that performs a heat treatment on both the side sections (opposite widthwise end sections) of the sheet glass SG. The cooling rollers 51 are disposed immediately below the partitioning components 50. Also, the cooling rollers 51 are disposed on opposite sides in the thickness direction of the sheet glass SG and on opposite sides in the width direction of the sheet glass SG. More specifically, the cooling rollers 51 subject the sheet glass SG, which has separated from the forming member 41, to a heat treatment immediately below the forming member 41. The cooling rollers 51 disposed on opposite sides in the thickness direction of the sheet glass SG operate in pairs. Thus, there are two pairs of cooling rollers 51, 51, and so on, each pair sandwiching one of the opposite side sections (opposite widthwise end sections) of the sheet glass SG.

Each cooling roller 51 is cooled by air with an air-cooling pipe passed through the interior thereof. The cooling rollers 51 contact the side sections (edges) of the sheet glass SG and rapidly cool the side sections of the sheet glass SG through heat conduction (rapid-cooling step). The cooling rollers 51 rapidly cool the side sections of the sheet glass SG in a manner such that the viscosity of the side sections of the sheet glass SG becomes greater than or equal to $10^{9.0}$ poise. It should be noted that, preferably, the cooling rollers 51 rapidly cool the side sections of the sheet glass SG in a manner such that the viscosity of the side sections of the sheet glass SG falls within a range of $10^{9.0}$-$10^{10.5}$ poise.

It should be noted that the cooling of the side sections of the sheet glass SG by the cooling rollers 51 has an effect on the equalization of the thickness of the sheet glass SG.

(2-4) Cooling Unit

The cooling unit 60 is a unit that performs a heat treatment on the sheet glass SG. Specifically, the cooling unit 60 is a unit that cools the sheet glass SG to a temperature near the annealing point. The cooling unit 60 is disposed below the partitioning components 50 and on the top plate 80a of an annealing furnace 80. The cooling unit 60 cools an upstream region of the sheet glass SG (upstream-region cooling step). The upstream region of the sheet glass SG is a region in the sheet glass SG in which the temperature of the central section (central region) of the sheet glass SG is higher than the annealing point. The central section of the sheet glass SG is the central portion of the sheet glass SG in the width direction thereof, and is a region that includes the valid range of the sheet glass SG and the vicinity thereof. Stated differently, the central section of the sheet glass SG is the portion sandwiched by both the side sections of the sheet glass SG. Specifically, the upstream region includes a first temperature region and a second temperature region. The first temperature region is a region of the sheet glass SG from immediately below the lower end 41a of the forming member 41 to where the temperature of the central region of the sheet glass SG (more specifically, the temperature at the widthwise center of the central region) comes near the softening point. The second temperature region is a temperature region in which the temperature of the central region of the sheet glass SG (more specifically, the temperature of the widthwise center of the central region) ranges from a temperature near the softening point to a temperature near the annealing point. That is, the cooling unit 60 cools the sheet glass SG in a manner such that the temperature of the central region of the sheet glass SG nears the annealing point. The central region of the sheet glass SG then passes the annealing point and the strain point and is cooled to a temperature near room temperature inside a later-mentioned annealing furnace 80 (downstream-region cooling step (annealing step)).

The cooling unit 60 cools the sheet glass SG according to a plurality of temperature profiles such that the thickness and warpage of the sheet glass SG assume desired values. More specifically, a plurality of temperature profiles are set in the upstream region along the downward-flow direction of the sheet glass SG. Herein, a "temperature profile" is the temperature distribution of ambient temperatures in the vicinity of the sheet glass SG along the width direction of the sheet glass SG. Stated differently, a temperature profile is the distribution of target ambient temperatures. The cooling rollers 51 and the cooling unit 60 control the ambient temperatures to achieve the temperature profiles.

The cooling unit 60 includes a plurality of units. The plurality of temperature profiles are achieved by controlling the plurality of units independently. More specifically, the cooling unit 60 includes a central-section cooling unit 61 and two side-section cooling units 71, 71. As illustrated in FIG. 4, the central-section cooling unit 61 is disposed in the widthwise central area of the forming device 40, and cools the central section of the sheet glass SG (central-section cooling step). The central-section cooling unit 61 is disposed on both sides in the thickness direction of the sheet glass SG. The side-section cooling units 71 are disposed at positions adjacent to the central-section cooling unit 61. That is, the side-section cooling units 71 are disposed on both sides in the thickness direction of the sheet glass SG so as to oppose one another across the sheet glass SG, and cool the side sections (edges) of the sheet glass SG and the periphery of the side sections (side-section cooling step). The central-section cooling unit 61 and the side-section cooling units 71 are disposed in proximity to the sheet glass SG.

The configuration of the central-section cooling unit 61 and the configuration of the side-section cooling unit 71 will be described in detail below with reference to FIGS. 5 to 8. It should be noted that in the cross-sectional views illustrated in FIGS. 5 and 7, only the configuration on one side of each cooling unit 61, 71 is illustrated with respect to the position where the sheet glass SG passes (illustrated by an alternate long and short dashed line W). Further, in the description below, the term "rear" refers to the direction away from the surface of the sheet glass SG.

(2-4-1) Central-Section Cooling Unit

Figure 5:
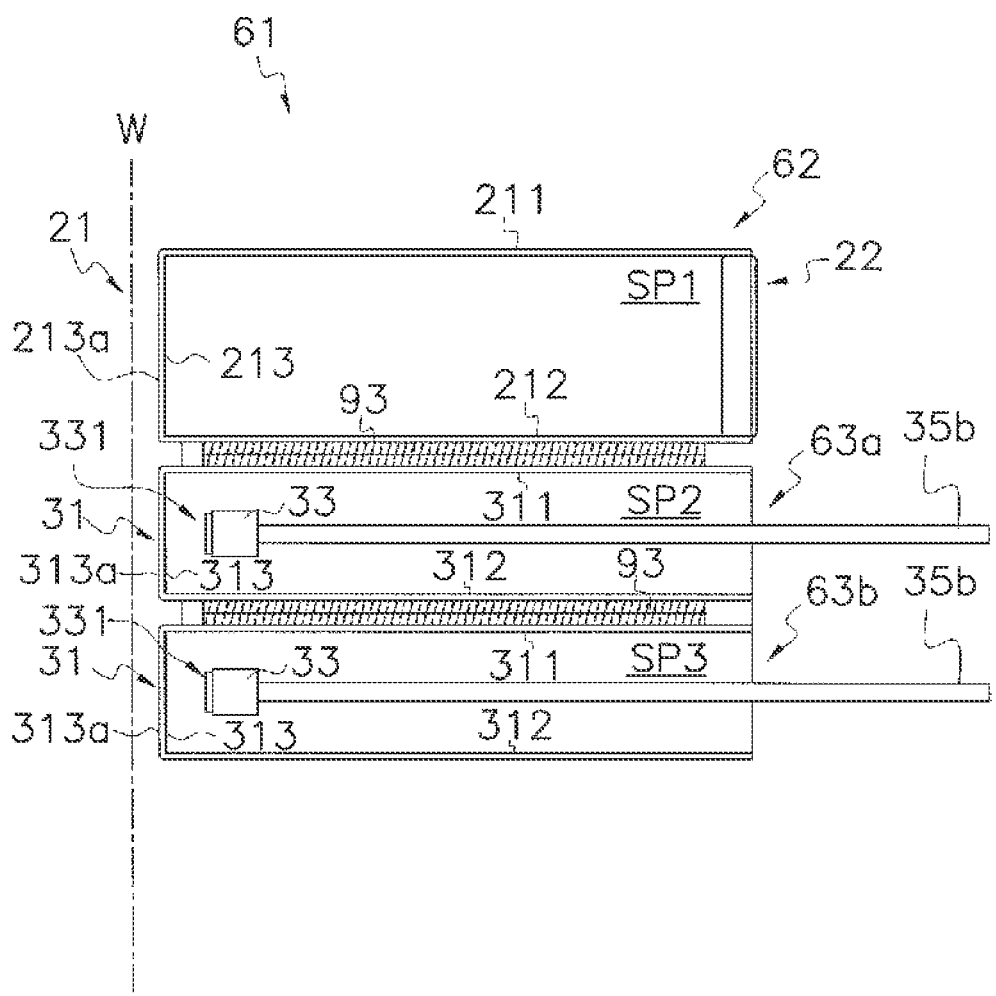
FIG. 5 is a cross-sectional view (cross-sectional view of a central-section cooling unit) taken along line V-V of FIG. 4.

The central-section cooling unit 61 cools the central section of the sheet glass SG in stages along the downward-flow direction (central-section cooling step). The central-section cooling unit 61 is made up of an upper air-cooling unit 62 and lower air-cooling units 63a, 63b. The upper air-cooling unit 62 and the two lower air-cooling units 63a, 63b are arranged along the downward-flow direction of the sheet glass SG. More specifically, the two lower air-cooling units 63a, 63b are arranged below the upper air-cooling unit 62. As illustrated in FIG. 5, the upper air-cooling unit 62 and the two lower air-cooling units 63a, 63b are connected with one another, with heat-insulating members 93 disposed therebetween. The respective heat-insulating members 93 block the movement of heat between a space formed inside the upper air-cooling unit 62 (first space SP1) and a space formed inside the lower air-cooling unit 63a disposed in the upper position (second space SP2) and the movement of heat between the second space SP2 and a space formed by the lower air-cooling unit 63b disposed in the lower position (third space SP3). The upper air-cooling unit 62 and the lower air-cooling units 63a, 63b can be controlled independently.

(a) Upper Air-Cooling Unit

The upper air-cooling unit 62 is located immediately below the partitioning components 50. The upper air-cooling unit 62 is a unit for achieving the temperature profile in a region that determines the thickness of the sheet glass SG. The region that determines the thickness of the sheet glass SG corresponds to the aforementioned first temperature region. The upper air-cooling unit 62 is controlled so as to make the thickness of the sheet glass SG uniform in the width direction (first central-section cooling step). The upper air-cooling unit 62 mainly includes an upper cooling adjustment plate 21 and a rear water-cooling unit 22.

(a-1) Upper Cooling Adjustment Plate

The upper cooling adjustment plate 21 extends in the width direction of the sheet glass SG (i.e., the horizontal direction). The length of the upper cooling adjustment plate 21 in the length direction thereof corresponds to the length of the portion of the sheet glass SG excluding the side sections and the periphery of the side sections of the sheet glass SG. Thus, the length of the upper cooling adjustment plate 21 is shorter than the widthwise length of the sheet glass SG.

The upper cooling adjustment plate 21 has a first ceiling section 211, a first bottom section 212, and a first opposition section 213. The first ceiling section 211 is the portion forming the ceiling of the upper air-cooling unit 62. The first bottom section 212 is the portion forming the bottom of the upper air-cooling unit 62. The first opposition section 213 is the portion of the upper cooling adjustment plate 21 excluding the first ceiling section 211 and the first bottom section 212.

In the present embodiment, a metal component is used for the upper cooling adjustment plate 21. Particularly, the first opposition section 213 is preferably a component having a heat resistance of 600° C. or higher in the atmosphere. Further, the first opposition section 213 is preferably a component having a thermal conductivity of at least 30 W/m·K or greater and a thermal emissivity characteristic of 0.85 or greater in the usage temperature range. In the present embodiment, pure nickel (thermal conductivity: 79.3 W/m° C.) is used as the first opposition section 213.

As illustrated in FIG. 5, the first opposition section 213 is subjected to a bending process. More specifically, the first opposition section 213 is a channel (channel iron). The first opposition section 213 has a surface (first opposition surface) 213a that opposes the sheet glass SG. The upper cooling adjustment plate 21 forms the first space SP1 together with side walls (not illustrated).

(a-2) Rear Water-Cooling Unit

The rear water-cooling unit 22 is a unit that cools, with water, the air inside the first space SP1. The rear water-cooling unit 22 is disposed in the rear of the upper cooling adjustment plate 21, and water-cools the first space SP1 from the rear. The first space SP1 is closed by the rear water-cooling unit 22. The rear water-cooling unit 22 is connected to a first cooling-water supply unit (not illustrated). The amount of water supplied from the first cooling-water supply unit to the rear water-cooling unit 22 is adjusted by a first cooling-water supply valve 22a (see FIG. 9).

(b) Lower Air-Cooling Units

The lower air-cooling units 63a, 63b are disposed below the upper air-cooling unit 62, as described above. The lower air-cooling units 63a, 63b are units for achieving the temperature profiles in a region where the control of the warpage amount of the sheet glass SG is started. Herein, the region where the control of the warpage amount of the sheet glass SG is started corresponds to the aforementioned second temperature region.

Figure 6:
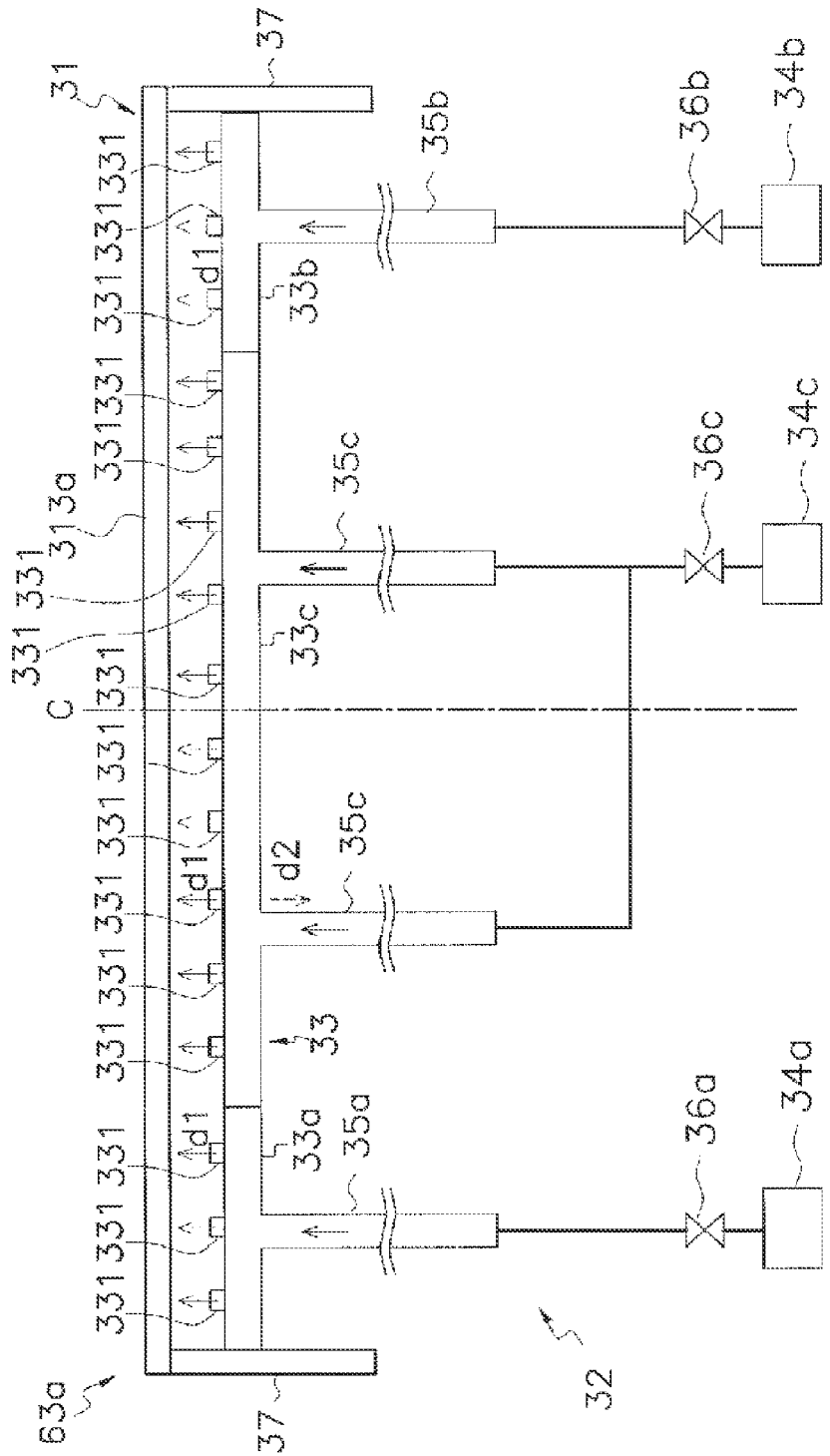
FIG. 6 is a schematic plan view of a lower air-cooling unit.

The lower air-cooling unit 63a controls the temperature of the sheet glass SG in the upstream side of the second temperature region (second central-section cooling step). The lower air-cooling unit 63b controls the temperature of the sheet glass SG in the downstream side of the second temperature region (third central-section cooling step). The lower air-cooling unit 63a includes the second space SP2, and the lower air-cooling unit 63b includes the third space SP3. The lower air-cooling units 63a, 63b have the same configuration. Thus, the configuration of the lower air-cooling unit 63a will be described below. As illustrated in FIG. 6, the lower air-cooling unit 63a mainly includes a lower cooling adjustment plate 31 and a temperature control unit 32.

(b-1) Lower Cooling Adjustment Plate

The lower cooling adjustment plate 31 has the same configuration as the aforementioned upper cooling adjustment plate 21. That is, the lower cooling adjustment plate 31 extends along the width direction of the sheet glass SG (i.e., the horizontal direction), and the length thereof in the length direction is the same as the lengthwise length of the upper cooling adjustment plate 21.

The lower cooling adjustment plate 31 has a second ceiling section 311, a second bottom section 312, and a second opposition section 313. The second ceiling section 311 is the portion forming the ceiling of the lower air-cooling unit 63a. The second bottom section 312 is the portion forming the bottom of the lower air-cooling unit 63a. The second opposition section 313 is the portion of the lower cooling adjustment plate 31 excluding the second ceiling section 311 and the second bottom section 312.

As with the upper cooling adjustment plate 21, a metal component is used for the lower cooling adjustment plate 31. Particularly, the second opposition section 313 is preferably a component having a heat resistance of 600° C. or higher in the atmosphere. Further, the second opposition section 313 is preferably a component having a thermal conductivity of at least 30 W/m·K or greater and a thermal emissivity characteristic of 0.85 or greater in the usage temperature range. In the present embodiment, pure nickel (thermal conductivity: 79.3 W/m° C.) is used as the second opposition section 313.

Moreover, as with the first opposition section 213, the second opposition section 313 is subjected to a bending process (see FIG. 5). More specifically, the second opposition section 313 is a channel (channel iron), and the second opposition section 313 has a surface (second opposition surface) 313a that opposes the sheet glass SG. The lower cooling adjustment plate 31 forms the second space SP2 together with side walls 37.

(b-2) Temperature Control Unit

The temperature control unit 32 is a unit for adjusting the temperature of the lower cooling adjustment plate 31. The temperature control unit 32 is made up mainly of a temperature adjustment pipe 33 and a plurality of gas supply units 34a, 34b, 34c.

A fluid for cooling or heating the entire lower cooling adjustment plate 31 flows through the temperature adjustment pipe 33. Here, the fluid that flows through the temperature adjustment pipe 33 is a gas (for example, air or an inert gas such as nitrogen). As illustrated in FIG. 6, the temperature adjustment pipe 33 is disposed along the length direction of the lower cooling adjustment plate 31. The temperature adjustment pipe 33 has a plurality of ejection openings (nozzles) 331, 331, and so on, formed at equal spacings. More specifically, the ejection openings 331 are formed at symmetrical positions with respect to the center line C of the temperature adjustment pipe 33. The ejection openings 331 are provided at positions that oppose the back surface of the second opposition surface 313a. That is, the gas ejected from the ejection openings 331 is blown against the back surface of the second opposition surface 313a.

The temperature adjustment pipe 33 has an interior space. The interior space is divided into three parts therein. Thus, the temperature adjustment pipe 33 has a first side-section adjustment section 33a, a second side-section adjustment section 33b, and a central-section adjustment section 33c. The first side-section adjustment section 33a is a section for adjusting the temperature of the first side section of the lower cooling adjustment plate 31. The second side-section adjustment section 33b is a section for adjusting the temperature of the second side section of the lower cooling adjustment plate 31. The second side section is located on the opposite side from the first side section. The central-section adjustment section 33c is a section for adjusting the temperature of the widthwise central section of the lower cooling adjustment plate 31. Moreover, the temperature adjustment pipe 33 is connected to a plurality of introduction pipes 35a, 35b, 35c, 35c. The introduction pipes 35a, 35b, 35c, 35c are pipes for sending a gas, which serves as the medium for heat exchange, to the temperature adjustment pipe 33. More specifically, a first introduction pipe 35a is connected to the first side-section adjustment section 33a of the temperature adjustment pipe 33; a second introduction pipe 35b is connected to the second side-section adjustment section 33b of the temperature adjustment pipe 33; and two, third introduction pipes 35c, 35c are connected to the central-section adjustment section 33c of the temperature adjustment pipe 33. The first introduction pipe 35a, the second introduction pipe 35b, and the third introduction pipes 35c send, to the respective temperature adjustment sections 33a, 33b, 33c, a gas supplied respectively from different gas supply units 34a, 34b, 34c. More specifically, as illustrated in FIG. 6, the first introduction pipe 35a is connected to the first gas supply unit 34a, and the amount of gas sent from the first gas supply unit 34a to the first introduction pipe 35a is adjusted by a first gas supply valve 36a. Further, the second introduction pipe 35b is connected to the second gas supply unit 34b, and the amount of gas sent from the second gas supply unit 34b to the second introduction pipe 35b is adjusted by a second gas supply valve 36b. Moreover, the two third introduction pipes 35c, 35c are connected to the third gas supply unit 34c, and the amount of gas sent from the third gas supply unit 34c to the third introduction pipes 35c, 35c is adjusted by a third gas supply valve 36c.

It should be noted that the gas blown against the lower cooling adjustment plate 31 is controlled to flow in a manner such that, after being blown against the lower cooling adjustment plate 31, the gas flows toward a direction d2 exactly opposite from the ejection direction d1. By controlling the gas flow in a manner such that the gas ejected from each ejection opening 331 flows in the direction d2 before flowing in the length direction of the lower cooling adjustment plate 31, the gas ejected from one ejection opening 331 is prevented from affecting the flow direction d1 of the gas ejected from another ejection opening 331. The gas flowing in the direction d2 is released outside the furnace.

(2-4-2) Side-Section Cooling Units

The side-section cooling units 71 cool, either continuously or in stages, the side sections of the sheet glass SG that have been cooled rapidly by the cooling rollers 51, as well as the periphery of the side sections of the sheet glass SG, along the downward-flow direction of the sheet glass SG (side-section cooling step). The side-section cooling units 71 operate at a lower cooling capacity than the cooling rollers 51. In other words, the quantity of heat removed by the side-section cooling units 71 from the side sections of the sheet glass SG is smaller compared to the quantity of heat removed by the cooling rollers 51 from the side sections of the sheet glass SG. As described above, the side-section cooling units 71 are disposed on both sides of the central-section cooling unit 61 (see FIG. 4). The side-section cooling units 71 are disposed in proximity to the surface of the sheet glass SG. The side-section cooling units 71 cool the side sections of the sheet glass in a manner so as to maintain the viscosity of the side sections of the sheet glass SG within the range of $10^{9.0}$-$10^{14.5}$ poise. It should be noted that, preferably, the side-section cooling units 71 cool the side sections of the sheet glass in a manner such that the viscosity of the side sections of the sheet glass SG is maintained within the range of $10^{10.5}$-$10^{14.5}$ poise.

Figure 7:
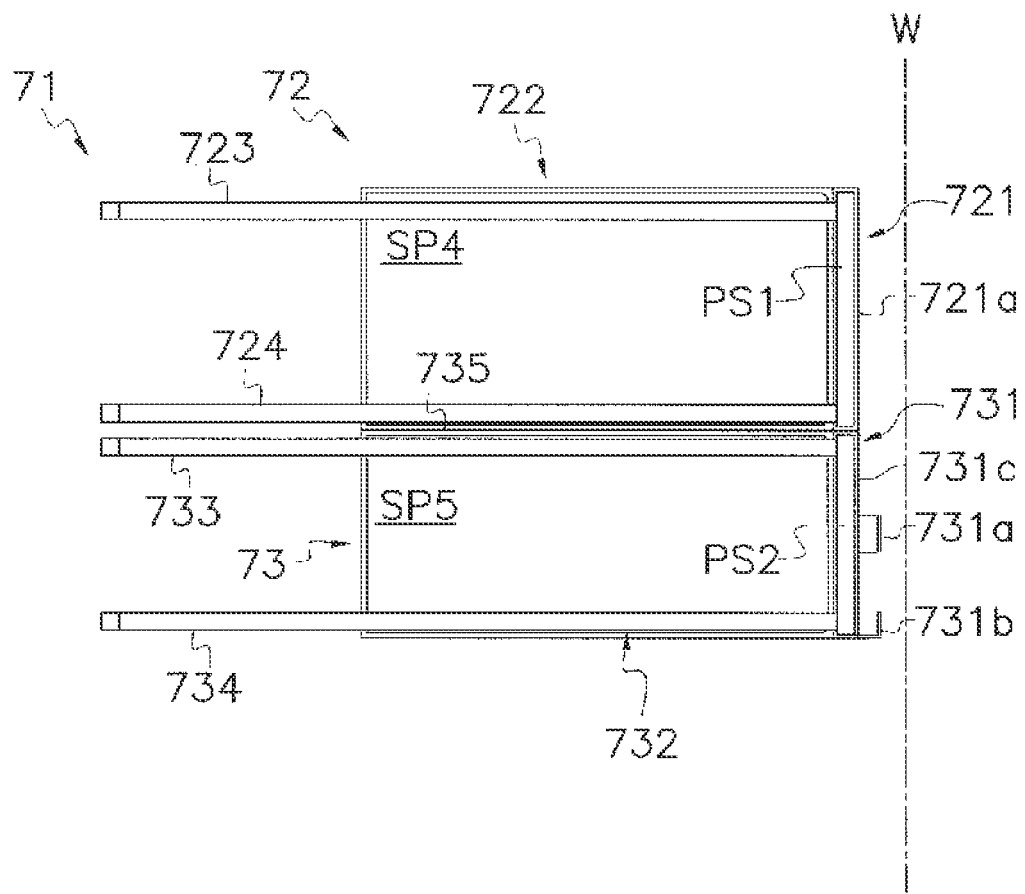
FIG. 7 is a cross-sectional view (cross-sectional view of a side-section cooling unit) taken along line VII-VII of FIG. 4.

As illustrated in FIG. 7, each side-section cooling unit 71 is made up of an upper water-cooling unit 72 and a lower water-cooling unit 73. The upper water-cooling unit 72 and the lower water-cooling unit 73 are disposed along the downward-flow direction of the sheet glass SG. The upper water-cooling unit 72 and the lower water-cooling unit 73 are controlled independently.

(a) Upper Water-Cooling Unit

The upper water-cooling unit 72 is a unit for achieving the temperature profile in a region that has an effect on the adjustment of the thickness and/or the warpage amount of the sheet glass SG (first side-section cooling step). As illustrated in FIG. 7, the upper water-cooling unit 72 is located immediately below the aforementioned cooling rollers 51. Further, the upper water-cooling unit 72 is placed on the top plate 735 of the later-mentioned lower water-cooling unit 73. The upper water-cooling unit 72 is configured such that it can move closer to or away from the sheet glass SG by moving horizontally on the top plate 735 of the lower water-cooling unit 73. The sheet glass SG is cooled at a necessary cooling speed mainly by the radiant heat transfer of the upper water-cooling unit 72. Herein, the "necessary cooling speed" is a cooling speed that can minimize the contraction of the sheet width of the glass SG that has passed the cooling rollers 51, and a cooling speed that does not cause cracks in the sheet glass SG during the cooling process in and beyond the lower water-cooling unit 73. That is, the upper water-cooling unit 72 cools the sheet glass SG to the maximum extent possible within a range that does not negatively affect the glass SG. The upper water-cooling unit 72 mainly includes an upper water-cooling plate 721 and an upper connection unit 722.

(a-1) Upper Water-Cooling Plate

The upper water-cooling plate 721 is made of a component that has a relatively high thermal conductivity and excellent oxidation resistance and heat resistance. In the present embodiment, stainless steel is used for the upper water-cooling plate 721. A first flow path PS1 for the passage of a fluid (water in the present embodiment) is formed inside the upper water-cooling plate 721. The first flow path PS1 is structured so as to cool the surface 721a (the surface opposing the sheet glass SG) of the upper water-cooling plate 721 from the back side.

The surface (the surface opposing the sheet glass SG) of the upper water-cooling plate 721 is coated in order to increase thermal emissivity. Preferably, the thermal emissivity of the upper water-cooling plate 721 is 0.9 or greater.

(a-2) Upper Connection Unit

The upper connection unit 722 is a unit that is disposed in the rear of the upper water-cooling plate 721 and connected to the upper water-cooling plate 721. The upper connection unit 722 mainly includes an upper water-feed pipe 723 and an upper water-drain pipe 724. The upper water-feed pipe 723 and the upper water-drain pipe 724 are disposed inside a fourth space SP4 formed in the rear of the upper water-cooling plate 721 (see FIG. 7). The fourth space SP4 is a space formed by thin, stainless-steel plates, and is made up of a top plate, a bottom plate, and side walls. The upper water-feed pipe 723 is connected to the upper section of the first flow path PS1 of the upper water-cooling plate 721. The upper water-feed pipe 723 is supplied with cooling water, which is sent from a second cooling-water supply unit (not illustrated). The second cooling-water supply unit is different from the aforementioned first cooling-water supply unit. The cooling water is supplied through the upper water-feed pipe 723 to the first flow path PS1 of the upper water-cooling plate 721. The amount of cooling water supplied from the second cooling-water supply unit is adjusted by a second cooling-water supply valve 72a (see FIG. 9). The upper water-drain pipe 724 is connected to the lower section of the first flow path PS1 of the upper water-cooling plate 721. The cooling water that has been warmed by passing through the first flow path PS1 is drained through the upper water-drain pipe 724.

(b) Lower Water-Cooling Unit

As illustrated in FIG. 7, the lower water-cooling unit 73 is located immediately below the upper water-cooling unit 72. The lower water-cooling unit 73 is a unit for achieving the temperature profile in a region that has an effect on the control of the warpage amount of the sheet glass SG (second side-section cooling step). The lower water-cooling unit 73 is placed on the top plate 80a of a later-mentioned annealing furnace 80. The lower water-cooling unit 73 is fixed to the aforementioned central-section cooling unit 61. The sheet glass SG is cooled at a necessary cooling speed mainly by the radiant heat transfer of the lower water-cooling unit 73. Herein, the "necessary cooling speed" is a cooling speed that brings the periphery of the edges of the sheet glass SG to an optimal temperature when the sheet glass enters the annealing furnace 80. Also, the "necessary cooling speed" is a cooling speed that can minimize the contraction of the sheet width of the glass SG and that does not cause cracks in the sheet glass SG during the cooling process in and beyond the annealing furnace 80. That is, the lower water-cooling unit 73 cools the sheet glass SG to the maximum extent possible within a range that does not negatively affect the glass SG. The lower water-cooling unit 73 mainly includes a lower water-cooling plate 731 and a lower connection unit 732.

(b-1) Lower Water-Cooling Plate

The lower water-cooling plate 731 is made of a component that has a relatively high thermal conductivity and excellent oxidation resistance and heat resistance. In the present embodiment, stainless steel is used for the lower water-cooling plate 731. A second flow path PS2 for the passage of a fluid (water in the present embodiment) is formed inside the lower water-cooling plate 731. The second flow path PS2 is structured so as to cool the surface 731c (the surface opposing the sheet glass SG) of the lower water-cooling plate 731 from the back side.

Preferably, the thermal emissivity of the lower water-cooling plate 731 is also 0.9 or greater.

Figure 8:
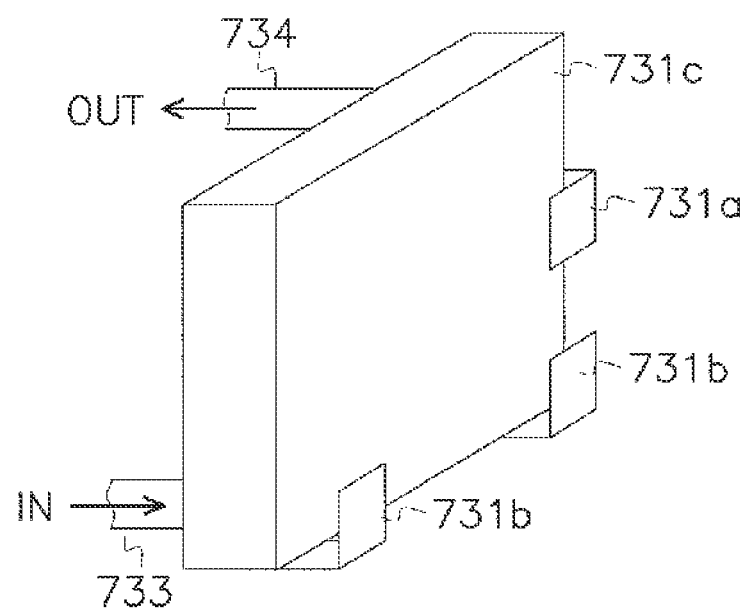
FIG. 8 is a perspective view of a lower water-cooling unit.

Moreover, as illustrated in FIG. 8, an upper supporting component 731a and lower supporting components 731b are attached to the surface of the lower water-cooling plate 731. The upper supporting component 731a and the lower supporting components 731b are components that can support a barrier component (e.g., a fiberboard) on the surface of the lower water-cooling plate 731. The barrier component is a component for blocking thermal radiation from the lower water-cooling plate 731. By supporting a barrier component with the upper supporting component 731a and the lower supporting components 731b, a portion of the lower water-cooling plate 731 is covered up.

(b-2) Lower Connection Unit

The lower connection unit 732 has the same configuration as the upper connection unit 722. That is, the lower connection unit 732 is a unit that is disposed in the rear of the lower water-cooling plate 731 and connected to the lower water-cooling plate 731. The lower connection unit 732 mainly includes a lower water-feed pipe 733 and a lower water-drain pipe 734. The lower water-feed pipe 733 and the lower water-drain pipe 734 are disposed inside a fifth space SP5 formed in the rear of the lower water-cooling plate 731 (see FIG. 7). Like the fourth space SP4, the fifth space SP5 is a space formed by thin, stainless-steel plates. The lower water-feed pipe 733 is connected to the upper section of the second flow path PS2 of the lower water-cooling plate 731. The lower water-feed pipe 733 is supplied with cooling water, which is sent from a third cooling-water supply unit (not illustrated). The third cooling-water supply unit is different from the aforementioned first cooling-water supply unit and the second cooling-water supply unit. The cooling water is supplied through the lower water-feed pipe 733 to the second flow path PS2 of the lower water-cooling plate 731. The amount of cooling water supplied from the third cooling-water supply unit is adjusted by a third cooling-water supply valve 73a (see FIG. 9). The lower water-drain pipe 734 is connected to the lower section of the second flow path PS2 of the lower water-cooling plate 731. The cooling water that has been warmed by passing through the second flow path PS2 is drained through the lower water-drain pipe 734.

(2-5) Down-Draw Rollers

The down-draw rollers 81 are disposed inside the annealing furnace 80. The annealing furnace 80 is a space disposed immediately below the cooling unit 60. In the annealing furnace 80, the temperature of the sheet glass SG is cooled from a temperature near the annealing point to a temperature near room temperature (downstream-region cooling step (annealing step)). The down-draw rollers 81 draw downward the sheet glass SG, which has passed through the cooling unit 60, in the downward-flow direction of the sheet glass SG. A plurality of down-draw rollers 81 are disposed on both sides in the thickness direction of the sheet glass SG (see FIG. 3) and on both sides in the width direction of the sheet glass SG (see FIG. 4). The down-draw rollers 81 are driven by a motor (not illustrated), and the down-draw rollers 81 rotate inward with respect to the sheet glass SG. The down-draw rollers 81 disposed on both sides in the thickness direction of the sheet glass SG operate in pairs, and the pairs of down-draw rollers 81, 81, and so on, draw the sheet glass SG downward.

(2-6) Cutting Device

The cutting device 90 cuts the sheet glass SG, which has passed through the annealing furnace 80 and has been cooled to a temperature near room temperature, into predetermined sizes. As a result, the sheet glass SG is formed into glass pieces. The cutting device 90 is disposed below the annealing furnace 80, and cuts the sheet glass SG at predetermined time intervals.

(2-7) Control Device

Figure 9:
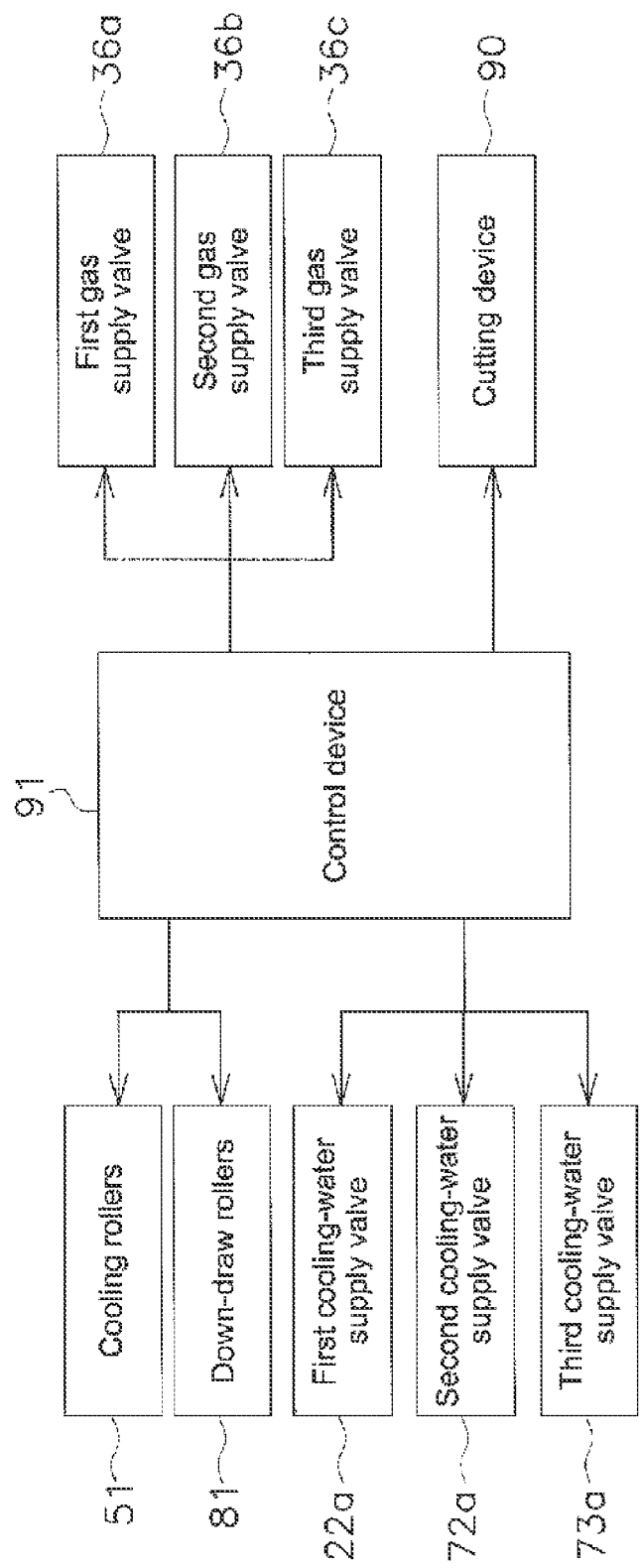
FIG. 9 is a diagram illustrating a control device and various mechanisms connected to the control device.

The control device 91 is configured, for example, of a CPU, a RAM, a ROM, and a hard disk. As illustrated in FIG. 9, the control device 91 is connected to the cooling rollers 51, the down-draw rollers 81, the first gas supply valve 36a, the second gas supply valve 36b, the third gas supply valve 36c, the first cooling-water supply valve 22a, the second cooling-water supply valve 72a, the third cooling-water supply valve 73a, the cutting device 90, and the like.

The control device 91 controls the respective drive sections of the cooling rollers 51, the down-draw rollers 81, the cutting device 90, and the like. The control device 91 also controls the opening/closing and the degree of opening of the first gas supply valve 36a, the second gas supply valve 36b, the third gas supply valve 36c, the first cooling-water supply valve 22a, the second cooling-water supply valve 72a, and the third cooling-water supply valve 73a.

(3) Temperature Profiles and Temperature Control by Cooling Unit

Figure 10:
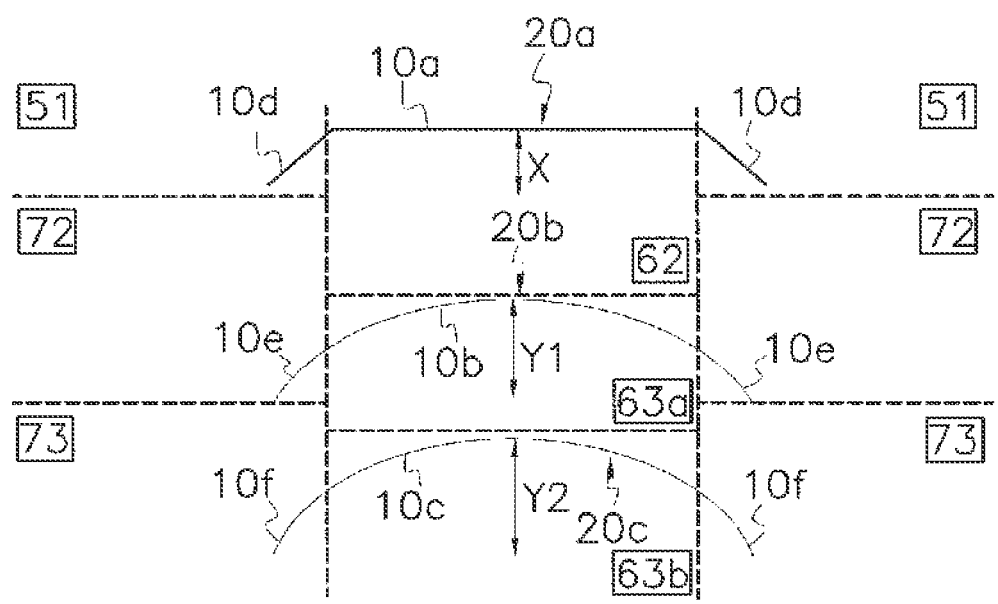
FIG. 10 is a diagram illustrating ambient temperatures controlled according to a plurality of temperature profiles.

Next, the temperature profiles used in the glass-substrate manufacturing method of the present embodiment and the control of the cooling unit for achieving those temperature profiles will be described with reference to FIG. 10. In FIG. 10, the regions partitioned by broken lines indicate the arrangement of the cooling rollers 51 and the various units 62, 63a, 63b, 72, 73 included in the cooling unit. The curved lines 10b, 10c, 10e, 10f and the straight lines 10a, 10d contained in the regions partitioned by the broken lines are sub-profiles included in the temperature profiles 20a, 20b, 20c achieved by the cooling rollers 51 and/or the various units 62, 63a, 63b, 72, 73.

As described above, in the present embodiment, the ambient temperatures are controlled independently in the downward-flow direction of the sheet glass SG on the basis of a plurality of temperature profiles. The sheet glass SG is cooled in a manner such that, when the temperature of the sheet glass SG is within a predetermined temperature region, a tension is applied in the width direction of the sheet glass SG toward the side sections of the sheet glass SG. Herein, the "predetermined temperature region" is a temperature region in which the temperature of the sheet glass SG ranges from a temperature higher than the softening point to a temperature near the annealing point after the sheet glass SG has separated from the forming member 41. In other words, the predetermined temperature region is the aforementioned upstream region of the sheet glass SG.

As described above, the sheet glass SG after separating from the forming member 41 has a viscosity of $10^{5.7}$-$10^{7.5}$ poise. The sheet glass SG is increased in viscosity by being cooled by the cooling rollers 51 and the cooling unit 60. That is, the viscosity of the sheet glass SG (the viscosity of the central section and the side sections) increases along the downward-flow direction of the sheet glass SG. Stated differently, the viscosity of the sheet glass SG increases toward the downstream side of the sheet glass SG. In the present embodiment, the side sections of the sheet glass SG are cooled by the cooling rollers 51 and the side-section cooling units 71 in the upstream region. Specifically, the side sections of the sheet glass SG are cooled in a manner so as to maintain the viscosity within the range of $10^{9.0}$-$10^{14.5}$ poise. More specifically, the cooling rollers 51 rapidly cool the side sections of the sheet glass SG in a manner such that the viscosity of the side sections of the sheet glass SG falls within the range of $10^{9.0}$-$10^{10.5}$ poise, and the side-section cooling units 71 cool the side sections of the sheet glass in a manner such that the viscosity of the side sections of the sheet glass SG, which has been cooled rapidly by the cooling rollers 51, is maintained within the range of $10^{10.5}$-$10^{14.5}$ poise.

The plurality of temperature profiles are each set along the width direction of the sheet glass SG and the flow direction of the sheet glass SG (temperature profile setting step). Specifically, as illustrated in FIG. 10, the plurality of temperature profiles include a first temperature profile 20a, a second temperature profile 20b, and a third temperature profile 20c. The first temperature profile 20a is located more toward the high-temperature side in the flow direction than the second temperature profile 20b. The second temperature profile 20b is located more toward the high-temperature side in the flow direction than the third temperature profile 20c.

In the first temperature profile 20a, the widthwise temperature distribution in the central region of the sheet glass SG is uniform, and the temperature in both the widthwise end sections (both the side sections) of the sheet glass SG is lower than the temperature in the central region of the sheet glass SG. Herein, "the widthwise temperature distribution is uniform" means that the widthwise temperature distribution includes values ranging within ±0-10° C. with respect to a predetermined reference value (temperature). That is, in accordance with the first temperature profile 20a, the end sections of the sheet glass SG are rapidly cooled, while the temperature of the central region (central section) of the sheet glass SG is controlled such that it assumes a temperature that is uniform along the width direction and higher than the temperature of the end sections of the sheet glass SG (thickness-equalizing step; first temperature profile control step). It should be noted that the first temperature profile 20a is set in a manner such that there is a first temperature difference X between the temperature (average temperature) of the central region of the sheet glass SG and the temperature of both the end sections of the sheet glass SG.

The second temperature profile 20b and the third temperature profile 20c have temperatures lower than the first temperature profile 20a. The second temperature profile 20b and the third temperature profile 20c each have a temperature gradient along the width direction in the central region of the sheet glass SG. Specifically, in the second temperature profile 20b and the third temperature profile 20c, the temperature at the center section of the sheet glass SG is high, and the temperature of both the end sections of the sheet glass SG is low. More specifically, in the second temperature profile 20b and the third temperature profile 20c, the temperature is gradually reduced from the center section of the sheet glass SG toward both the end sections of the sheet glass SG. The center section of the sheet glass SG is the center section of the central region. That is, in accordance with the second temperature profile 20b and the third temperature profile 20c, the widthwise temperature distribution of the sheet glass SG is controlled so as to follow arch-shaped profiles (upward-convex parabolas) (warpage-reducing step; second temperature profile control step and third temperature profile control step). In other words, in the warpage-reducing step, the sheet glass SG is cooled while maintaining the temperature gradient (upward-convex parabola). Stated differently, in the warpage-reducing step, the sheet glass SG is cooled in a manner such that the temperature distribution continuously forms an upward-convex parabola.

It should be noted that the control according to the second temperature profile 20b is executed in the upstream side of the second temperature region with respect to the downward-flow direction of the sheet glass SG (second temperature profile control step), and the control according to the third temperature profile 20c is executed in the downstream side of the second temperature region with respect to the flow direction of the sheet glass SG (third temperature profile control step). Here, it is preferable to set the third temperature profile 20c so that it has a larger gradient than the second temperature profile 20b. Specifically, the second temperature profile 20b is set in a manner such that there is a second temperature difference Y1 between the temperature at the center section of the sheet glass SG and the temperature of the end sections of the sheet glass SG. Moreover, the third temperature profile 20c is set in a manner such that there is a third temperature difference Y2 between the temperature at the center section of the sheet glass SG and the temperature of the end sections of the sheet glass SG. The third temperature difference Y2 is greater than the second temperature difference Y1. It should be noted that the second temperature difference Y1 is greater than the first temperature difference X. That is, as regards the temperature profiles 20a to 20c, the temperature difference between the central region and the end sections, or the temperature difference between the central section and the end sections, becomes greater along the downward-flow direction of the sheet glass SG (X<Y1<Y2).

It should be noted that in the warpage-reducing step, the sheet glass SG is cooled in a manner such that, in a temperature region having temperatures lower than the third temperature profile 20c, the temperature gradient in the width direction of the sheet glass SG is reduced as the temperature of the sheet glass SG decreases toward a temperature near the strain point.

The temperature control performed by each unit will be described in detail below.

(3-1) Temperature Control by Upper Air-Cooling Unit

As described above, the upper air-cooling unit 62 achieves the temperature profile in the region that determines the thickness of the sheet glass SG (first central-section cooling step). Specifically, the upper air-cooling unit 62 makes the widthwise temperature distribution of the upper cooling adjustment plate 21 uniform. Thus, the ambient temperature (the temperature in the width direction of the sheet glass SG) in the periphery of the surface of the upper cooling adjustment plate 21 becomes uniform (sub-profile 10a).

(3-2) Temperature Control by Lower Air-Cooling Units

As described above, the lower air-cooling units 63a, 63b achieve the temperature profiles in the region where the adjustment of the warpage of the sheet glass SG is started (second central-section cooling step and third central-section cooling step). Specifically, the lower air-cooling units 63a, 63b adjust the temperature distribution of the lower cooling adjustment plate 31 in a manner such that the temperatures in the width direction of the sheet glass SG follow arch-shaped profiles (upward-convex parabolas). Specifically, the temperature at the lengthwise center of the lower cooling adjustment plate 31 is made highest, and the temperature at both the lengthwise end sections of the lower cooling adjustment plate 31 is made lowest. Moreover, the temperature is controlled in a manner such that it gradually decreases from the center toward both end sections. More specifically, among the first side-section adjustment section 33a, the second side-section adjustment section 33b, and the central-section adjustment section 33c included in the temperature adjustment pipe 33, the temperature of the gas ejected from the central-section adjustment section 33c is made higher than the temperature of the gas ejected from the first side-section adjustment section 33a and the second side-section adjustment section 33b. Thus, the ambient temperatures (the temperatures in the width direction of the sheet glass SG) in the periphery of the surface of the lower cooling adjustment plate 31 follow arch-shaped profiles (sub-profiles 10b and 10c).

It should be noted that, in the present embodiment, there are two lower air-cooling units 63a, 63b disposed along the flow direction of the sheet glass SG. The lower air-cooling unit 63b disposed in the lower position in the downward-flow direction of the sheet glass SG is controlled so as to form a larger parabolic temperature distribution than the lower air-cooling unit 63a disposed in the upper position. Specifically, as described above, the temperature gradient (the temperature gradient between the center section and the end sections) (see Y2 in FIG. 10) of the temperature profile 10c achieved by the lower air-cooling unit 63b is made larger than the temperature gradient (see Y1 in FIG. 10) of the profile 10b achieved by the lower air-cooling unit 63a (i.e., Y1<Y2).

(3-3) Temperature Control by Cooling Rollers

As described above, the cooling rollers 51 achieve the temperature profile in the region that has an effect on the equalization of the thickness of the sheet glass SG (rapid-cooling step). The cooling rollers 51 rapidly cool the side sections (end sections) of the glass that has merged at the lower end 41a of the forming member 41. That is, the ambient temperatures in the side sections of the sheet glass SG and the periphery of the side sections are lower than the ambient temperature in the periphery of the central section of the sheet glass SG (sub-profile 10d).

(3-4) Temperature Control by Upper Water-Cooling Unit

As described above, the upper water-cooling unit 72 achieves the temperature profile in the region that has an effect on the adjustment of the thickness and/or the warpage amount of the sheet glass SG (first side-section cooling step). The upper water-cooling unit 72 generates a temperature lower than the temperature generated by the upper air-cooling unit 62 and the lower air-cooling unit 63a. That is, the ambient temperatures in the side sections of the sheet glass SG and the periphery of the side sections are lower than the ambient temperature in the periphery of the central region of the sheet glass SG (sub-profile 10e).

(3-5) Temperature Control by Lower Water-Cooling Unit

As described above, the lower water-cooling unit 73 achieves the temperature profile in the region that has an effect on the adjustment of the warpage amount of the sheet glass SG (second side-section cooling step). The lower water-cooling unit 73 generates a temperature lower than the temperatures generated by the lower air-cooling units 63a, 63b. That is, the ambient temperatures in the side sections of the sheet glass SG and the periphery of the side sections are lower than the ambient temperature in the periphery of the central region of the sheet glass SG (sub-profile 10f).

(4) Characteristic Features (4-1)

According to the glass-substrate manufacturing method of the foregoing embodiment, in the region ranging from immediately below the forming member to above the annealing point, the temperature of the widthwise end sections (side sections) of the sheet glass SG is controlled depending on the position in the downward-flow direction of the sheet glass SG. Specifically, a plurality of temperature profiles are set along the downward-flow direction of the sheet glass SG, and the temperatures of the side sections of the sheet glass SG are controlled according to the plurality of temperature profiles by the respective water-cooling units 72, 73 disposed along the downward-flow direction of the sheet glass SG.

According to the glass-substrate manufacturing method of the foregoing embodiment, the cooling rollers 51, 51 rapidly cool the side sections of the sheet glass SG above the water-cooling units 72, 73. The side sections of the sheet glass SG cooled by the cooling rollers 51, 51 assume a greater thickness, and thus, have a greater heat quantity compared to the central section of the sheet glass SG. Thus, the temperature control of the side sections of the sheet glass SG has a great effect on the temperature control of the central section of the sheet glass SG.

Incidentally, the recent increase in demand for glass substrates has called for the mass production of glass substrates. Thus, it has become difficult to take the same amount of time, as in conventional methods, for the step of cooling the sheet glass SG. However, it is not possible to manufacture high-quality glass substrates simply by increasing the speed for cooling the glass sheet SG.

In the glass-substrate manufacturing method of the foregoing embodiment, the temperatures of the side sections of the sheet glass SG are achieved by independently controlling the plurality of cooling units disposed along the downward-flow direction of the sheet glass SG. In this way, the side sections of the sheet glass SG can be cooled effectively, and thus, high-quality glass substrates can be manufactured even in cases where the cooling time is shortened.

(4-2)

In the foregoing embodiment, after rapidly cooling the edges of the sheet glass SG by the cooling rollers 51, the edges of the sheet glass SG are continuously cooled by the side-section cooling units 71.

When the edges of the sheet glass SG are cooled rapidly by the cooling rollers 51, a tension is applied in the width direction of the sheet glass SG, as disclosed in JP-A-10-291826. However, the sheet glass SG that has been formed immediately below the forming member 41 is prone to widthwise shrinkage (contraction) even after being cooled rapidly by the cooling rollers 51. In the foregoing embodiment, following the cooling by the cooling rollers 51, the edges of the sheet glass SG are continuously cooled by the side-section cooling units 71. Thus, the widthwise contraction of the sheet glass SG can be inhibited.

Moreover, in the foregoing embodiment, the cooling capacity of the side-section cooling units 71 is made lower than the cooling capacity of the cooling rollers 51. Thus, the sheet glass SG can be prevented from breaking.

(4-3)

In the glass-substrate manufacturing method of the foregoing embodiment, after rapidly cooling the sheet glass SG through heat conduction, the sheet glass SG is cooled through radiant heat transfer. Thus, the edges of the sheet glass SG can be cooled efficiently.

(4-4)

In the glass-substrate manufacturing method of the foregoing embodiment, components (upper supporting component 731a and lower supporting components 731b) onto which a fiberboard can be arranged are provided on the surface of the lower water-cooling plate 731. Thus, in the region to be cooled by the lower water-cooling plate 731, thermal radiation can be partially blocked depending on the environment inside the furnace during cooling.

(4-5)

In the foregoing embodiment, the upper water-cooling unit 72 is configured so as to be horizontally movable on the top plate 735 of the lower water-cooling unit 73. Moreover, the lower water-cooling unit 73 is configured such that it can support a barrier component.

The upper water-cooling unit 72 can control the temperature of the sheet glass SG by changing the temperature and/or the flow rate of the fluid sent into the upper water-cooling plate 721 and also by moving closer to or away from the sheet glass SG. On the other hand, the lower water-cooling unit 73 can control the temperature of the sheet glass SG by: changing the temperature and/or the flow rate of the fluid sent into the lower water-cooling plate 731; and also by changing the cooling capacity by supporting a barrier component with the upper supporting component 731a and the lower supporting components 731b or removing the barrier component from the upper supporting component 731a and the lower supporting components 731b and also by changing the area of the barrier component to be supported.

(4-6)

In the foregoing embodiment, the step of cooling the sheet glass SG is performed while maintaining the viscosity of the side sections of the sheet glass SG, which has separated from the forming member, within the range of $10^{9.0}$-$10^{14.5}$ poise. If the viscosity of the side sections of the sheet glass SG is below $10^{9.0}$ poise, then the sheet glass SG is prone to deformation, and thus, the widthwise contraction of the sheet glass SG is likely to occur. On the other hand, if the viscosity of the side sections of the sheet glass SG is above $10^{14.5}$ poise, then the sheet glass SG may break because it cannot resist the stress that occurs inside the sheet glass SG.

That is, by cooling the sheet glass while maintaining the viscosity of the side sections of the sheet glass SG, which has separated from the forming member, within the range of $10^{9.0}$-$10^{14.5}$ poise, it is possible to inhibit the widthwise contraction of the sheet glass SG while preventing the sheet glass SG from breaking. Thus, a state is achieved in which a tension is applied in the width direction of the sheet glass SG toward both end sections of the sheet glass SG. Moreover, by cooling the sheet glass in a manner such that the viscosity of the side sections of the sheet glass SG increases along the downward-flow direction, the side sections of the sheet glass SG are cooled continuously or in stages, and thus, the sheet glass SG is prevented from being excessively cooled at once and breaking.

(4-7)

In the foregoing embodiment, the sheet glass SG, which has a viscosity of $10^{5.7}$-$10^{7.5}$ poise immediately below the forming member, is cooled rapidly in a manner such that the viscosity of the side sections falls within the range of $10^{9.0}$-$10^{10.5}$ poise, and after rapidly cooling the sheet glass SG, the sheet glass SG is further cooled in a manner such that the viscosity of the side sections falls within the range of $10^{10.5}$-$10^{14.5}$ poise. Thus, the sheet glass SG is prevented from breaking, and the widthwise contraction of the sheet glass SG is inhibited.

By bringing the cooling rollers 51 into contact with the sheet glass SG in this way, heat can be removed from the sheet glass SG in a short time through heat conduction, and thus, the sheet glass SG can be cooled rapidly. Furthermore, by retaining the sheet glass SG with the cooling rollers 51, the widthwise contraction can be inhibited more effectively.

Moreover, the sheet glass SG that has been rapidly cooled by the cooling rollers 51 is continuously cooled through radiant heat transfer by the cooling unit 60 provided spaced away from the sheet glass SG, and thus, the surface of the sheet glass SG can be prevented from being cooled excessively and breaking. It should be noted that, by providing a plurality of cooling units 60, the surface of the sheet glass SG can be effectively inhibited from being excessively cooled, and the sheet glass SG can be effectively inhibited from breaking.

(4-8)

According to the foregoing embodiment, in the thickness-equalizing step, the widthwise temperature distribution in the central region of the sheet glass SG is kept uniform, and the temperature in both the side sections of the sheet glass SG is made lower than the temperature in the central region. In this way, the side sections of the sheet glass SG are cooled in a manner such that the widthwise contraction is inhibited, whereas the central region of the sheet glass SG is cooled in a manner such that the thickness becomes uniform. Thus, the thickness of the sheet glass SG can be made uniform along the width direction.

It should be noted that, by performing the thickness-equalizing process during a period from immediately after the sheet glass SG has separated from the forming member and until the temperature of the sheet glass SG is cooled to the softening point, the plate thickness can be made more uniform.

(4-9)

According to the foregoing embodiment, in the warpage-reducing step, the widthwise temperature distribution of the sheet glass SG is set to temperatures lower than the temperature distribution in the thickness-equalizing step, and a temperature gradient is formed in the width direction of the sheet glass SG from a widthwise central section of the central region of the sheet glass SG toward the side sections. Further, the sheet glass is cooled in a manner such that the temperature gradient of the sheet glass SG is reduced as the temperature of the sheet glass SG decreases toward the strain point. Thus, it is possible to cool the sheet glass in a manner such that a tensile stress always acts on the widthwise central section of the sheet glass SG. Also, the sheet glass SG can be cooled while maintaining the thickness thereof uniform, and warpage of the sheet glass SG can also be reduced.

Moreover, in the warpage-reducing step, the sheet glass SG is cooled toward a temperature near the strain point of the sheet glass SG in a manner such that the temperature gradient formed in the width direction of the sheet glass SG is reduced. By cooling the sheet glass SG to the strain point in a manner such that the temperature gradient is reduced, the cooling amount in the widthwise central section of the sheet glass SG becomes larger than the cooling amount in the widthwise end sections of the sheet glass SG. In this way, the volumetric shrinkage rate of the sheet glass SG increases from the widthwise end sections of the sheet glass SG toward the central section, and thus, a tensile stress acts on the central section of the sheet glass SG. Particularly, a tensile stress acts on the central section of the sheet glass SG in both the flow direction and the width direction of the sheet glass SG. It should be noted that, preferably, the tensile stress acting in the flow direction of the sheet glass SG is larger than the tensile stress acting in the width direction of the sheet glass SG. With this tensile stress, the sheet glass can be cooled while maintaining the flatness of the sheet glass SG, and thus, the warpage of the sheet glass SG or the glass plate, can be further reduced.

(5) MODIFIED EXAMPLES (5-1) Modified Example A

In the foregoing embodiment, the temperature adjustment pipe 33 was divided into three parts therein, and the temperature adjustment pipe 33 included a first side-section adjustment section 33a, a second side-section adjustment section 33b, and a central-section adjustment section 33c. The temperature adjustment pipe 33, however, does not have to be divided into three parts, but may be divided into five. In this way, the temperature can be independently controlled more finely in the width direction of the sheet glass SG.

(5-2) Modified Example B

In the foregoing embodiment, pure nickel was employed as a material having high thermal conductivity. However, other materials may be used as the material having high thermal conductivity. For example, molybdenum, sintered SiC, recrystallized SiC, artificial graphite, iron, or tungsten may be used. Note, however, that in cases of employing molybdenum, it is preferable to use it in a non-oxidative atmosphere. In cases of using molybdenum in an oxidative atmosphere, it is preferable to apply an anti-oxidative coating. Sintered SiC and recrystallized SiC can be used in an oxidative atmosphere, whereas artificial graphite, iron, and tungsten can be employed in cases where they are used in a non-oxidative atmosphere.

(5-3) Modified Example C

In the foregoing embodiment, channels (the shape of channel iron) were used for the upper cooling adjustment plate 21 and the lower cooling adjustment plate 31. The upper cooling adjustment plate 21 and the lower cooling adjustment plate 31, however, are not limited to the aforementioned shape, and they may have other shapes. It is preferable to shape the upper cooling adjustment plate 21 and the lower cooling adjustment plate 31 in a manner such that there is minimal contact between the adjacent upper cooling adjustment plate 21 and lower cooling adjustment plate 31 and that heat conduction therebetween is minimized. For example, the upper cooling adjustment plate 21 and the lower cooling adjustment plate 31 may have the shape of a round rod (circular cylinder) or an odd-numbered polygonal cylinder.

(5-4) Modified Example D

In the foregoing embodiment, the ambient temperature was controlled by the upper air-cooling unit 62 so as to be uniform along the width direction of the sheet glass SG (thickness-equalizing step). Thus, in the foregoing embodiment, the thickness (plate thickness) of the sheet glass SG was made uniform. The upper air-cooling unit 62, however, may be configured such that its temperature can be changed along the width direction of the sheet glass SG. For example, the widthwise ambient temperature may be changed by partitioning the space formed inside the air-cooling unit 62 into a plurality of segments and allowing the segmented spaces to be cooled separately, or by providing a structure on which a thermal retentive material can be partially installed inside the air-cooling unit 62. In this way, the thickness of the sheet glass SG can be made uniform, even in cases where, despite keeping the temperature of the central region uniform, thickness equalization in the width direction of the sheet glass SG cannot be achieved due to some kind of influence.

REFERENCE SIGNS LIST

11: Dissolution device
12: Fining device
21: Upper cooling adjustment plate
22: Rear water-cooling unit
31: Lower cooling adjustment plate
32: Temperature control unit
40: Forming device
41: Forming member
41a: Lower end of forming member
41b: Top sections of forming member
41c: Side surfaces (surfaces) of forming member
43: Groove
50: Partitioning components
51: Cooling rollers
60: Cooling unit
61: Central-section cooling unit
62: Upper air-cooling unit
63a, 63b: Lower air-cooling units
71: Side-section cooling units
72: Upper water-cooling unit
73: Lower water-cooling unit
80: Annealing furnace
81: Down-draw rollers
FG: Molten glass
SG: Sheet glass
100: Glass-substrate manufacturing device
721: Upper water-cooling plate
722: Upper connection unit
731: Lower water-cooling plate
732: Lower connection unit

CITATION LIST

Patent Literature

Patent Literature 1: Japanese Patent Application Laid-Open Publication JP-A-5-124827

The invention claimed is:

1. A method for manufacturing a glass substrate by employing a down-draw process in which a molten glass is made to overflow from a forming member and formed into a sheet glass and the sheet glass is then cooled while being drawn in a downward-flow direction, the method comprising:
after the sheet glass has separated from the forming member and when a temperature of the sheet glass is within a temperature region ranging from a temperature higher than the softening point to a temperature near the annealing point, cooling the sheet glass by maintaining a viscosity of side sections of the sheet glass within a range of $10^{9.0}$-$10^{14.5}$ poise while applying a tension toward said side sections,
wherein, in said temperature region,
a thickness-equalizing step of equalizing a thickness of the sheet glass along a width direction and
a warpage-reducing step of reducing warpage of the sheet glass after the thickness-equalizing step
are performed, and
wherein:
in the thickness-equalizing step, a widthwise temperature distribution in a central region of the sheet glass is kept uniform, and a temperature in both the side sections of the sheet glass is made lower than a temperature in the central region; and
in the warpage-reducing step, the widthwise temperature distribution of the sheet glass is set to temperatures lower than the widthwise temperature distribution in the thickness-equalizing step, and a temperature gradient is formed in the width direction of the sheet glass from a center section of the central region toward said side sections.

2. The method according to claim 1, wherein the sheet glass is cooled in a manner such that the viscosity of the side sections of the sheet glass increases along the downward-flow direction.

3. The method according to claim 2, wherein:
a viscosity of the sheet glass immediately below the forming member is $10^{5.7}$-$10^{7.5}$ poise; and
the sheet glass is cooled rapidly in a manner such that the viscosity of the side sections of the sheet glass becomes greater than or equal to $10^{9.0}$ poise.

4. The method according to claim 3, wherein, after rapidly cooling the sheet glass, the viscosity of said side sections is maintained within the range of $10^{9.0}$-$10^{14.5}$ poise by cooling said side sections with a cooling capacity that is lower than during the rapid cooling.

5. The method according to claim 1, wherein:
a viscosity of the sheet glass immediately below the forming member is $10^{5.7}$-$10^{7.5}$ poise; and
the sheet glass is cooled rapidly in a manner such that the viscosity of the side sections of the sheet glass becomes greater than or equal to $10^{9.0}$ poise.

6. The method according to claim 5, wherein, after rapidly cooling the sheet glass, the viscosity of said side sections is maintained within the range of $10^{9.0}$-$10^{14.5}$ poise by cooling said side sections with a cooling capacity that is lower than during the rapid cooling.

7. A method for manufacturing a glass substrate by employing a down-draw process in which a molten glass is made to overflow from a forming member and formed into a sheet glass and the sheet glass is then cooled while being drawn in a downward-flow direction, the method comprising:
after the sheet glass has separated from the forming member and when a temperature of the sheet glass is within a temperature region ranging from a temperature higher than the softening point to a temperature near the annealing point, cooling the sheet glass by maintaining a viscosity of side sections in the width direction of the sheet glass within a range of $10^{9.0}$-$10^{14.5}$ poise while applying a tension in the width direction of the sheet glass toward both said side sections, wherein, in said temperature region,
a thickness-equalizing step of equalizing a thickness of the sheet glass along the width direction and
a warpage-reducing step of reducing warpage of the sheet glass after the thickness-equalizing process step
are performed, and
wherein:
in the thickness-equalizing step, a widthwise temperature distribution in a central region of the sheet glass is kept uniform, and a temperature in both the side sections of the sheet glass is made lower than a temperature in the central region; and
in the warpage-reducing step, the widthwise temperature distribution of the sheet glass is set to temperatures lower than the widthwise temperature distribution in the thickness-equalizing step, and a temperature gradient is formed in the width direction of the sheet glass from a center section of the central region toward said side sections.

8. The method for manufacturing a glass substrate according to claim 7, wherein the sheet glass is cooled in a manner such that the viscosity of the side sections of the sheet glass increases along the downward-flow direction.

9. The method for manufacturing a glass substrate according to claim 7, wherein:
a viscosity of the sheet glass immediately below the forming member is $10^{5.7}$-$10^{7.5}$ poise;
the sheet glass is cooled rapidly in a manner such that the viscosity of the side sections of the sheet glass falls within a range of $10^{9.0}$-$10^{10.5}$ poise; and
after rapidly cooling the sheet glass, the viscosity of said side sections is maintained within a range of $10^{10.5}$-$10^{14.5}$ poise by cooling said side sections with a cooling capacity that is lower than during the rapid cooling.

10. The method for manufacturing a glass substrate according to claim 9, wherein cooling rollers are used to rapidly cool the sheet glass immediately below the forming member in a manner such that the viscosity of said side sections falls within the range of $10^{9.0}$-$10^{10.5}$ poise.

11. The method for manufacturing a glass substrate according to claim 10, wherein the viscosity of said side sections is maintained within the range of $10^{10.5}$-$10^{14.5}$ poise by cooling, with a cooling unit provided spaced away from the sheet glass, said sheet glass that has been cooled rapidly by the cooling rollers.

12. The method for manufacturing a glass substrate according to claim 7, wherein, in the warpage-reducing step, the sheet glass is cooled toward a temperature near the strain point of the sheet glass in a manner such that a temperature gradient formed in the width direction of the sheet glass is reduced.

* * * * *